(12) United States Patent
Shinoya et al.

(10) Patent No.: US 10,838,333 B2
(45) Date of Patent: Nov. 17, 2020

(54) IMAGE FORMING APPARATUS CAPABLE OF SUPPRESSING GENERATION OF NOISE UPON TURNING ON IMAGE FORMING APPARATUS

(71) Applicant: Brother Kogyo Kabushiki Kaisha, Nagoya (JP)

(72) Inventors: Shota Shinoya, Nisshin (JP); Yasuhiro Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/025,146

(22) Filed: Jul. 2, 2018

(65) Prior Publication Data

US 2019/0094768 A1 Mar. 28, 2019

(30) Foreign Application Priority Data

Sep. 28, 2017 (JP) .................................. 2017-188289
Sep. 28, 2017 (JP) .................................. 2017-188297

(51) Int. Cl.
*G03G 15/20* (2006.01)
*H04N 1/00* (2006.01)

(52) U.S. Cl.
CPC ..... *G03G 15/2053* (2013.01); *G03G 15/2028* (2013.01); *G03G 15/2032* (2013.01); *H04N 1/00896* (2013.01)

(58) Field of Classification Search
CPC ........................ G03G 15/2028; G03G 15/2053
See application file for complete search history.

(56) References Cited

U.S. PATENT DOCUMENTS

| 9,811,033 | B2 | 11/2017 | Miki | |
| 2007/0223977 | A1* | 9/2007 | Matsubara | ........... G03G 15/206 399/329 |
| 2013/0071155 | A1 | 3/2013 | Suzuki et al. | |
| 2014/0064763 | A1* | 3/2014 | Watanabe | .......... G03G 15/2064 399/67 |

FOREIGN PATENT DOCUMENTS

| JP | 2013-068660 A | 4/2013 |
| JP | 2013-120333 A | 6/2013 |
| JP | 2014-219699 A | 11/2014 |

* cited by examiner

*Primary Examiner* — Gregory H Curran
(74) *Attorney, Agent, or Firm* — Burr & Brown, PLLC

(57) ABSTRACT

An image forming apparatus includes: a fixing member; a holding member; and a cam member. The holding member holds the fixing member such that the fixing member can be displaced between a pressure contact position and a separation position. The cam member is rotatable about an axis in a first direction and a second direction. A distance between a cam surface of the cam member and the axis is reduced in the second direction. A part of the cam surface is in contact with the holding member at a first position in a state where the fixing member is at the separation position, and away from the holding member at a second position in a state where the fixing member is at the pressure contact position. The first direction is opposite to a direction from the first position to the second position about the axis with a smaller central angle.

24 Claims, 12 Drawing Sheets

IMAGE FORMING APPARATUS CAPABLE
OF SUPPRESSING GENERATION OF NOISE
UPON TURNING ON IMAGE FORMING
APPARATUS

CROSS REFERENCE TO RELATED
APPLICATION

This application claims priority from Japanese Patent Application Nos. 2017-188289 filed Sep. 28, 2017 and 2017-188297 filed Sep. 28, 2017. The entire content of each of the priority applications is incorporated herein by reference.

TECHNICAL FIELD

The present disclosure relates to an image forming apparatus.

BACKGROUND

Japanese Patent Application Publication No. 2013-68660 discloses an image forming apparatus provided with a fixing device. The fixing device includes a pressure roller, a nip plate, and a fusing belt. A recording sheet is nipped between the pressure roller and the fusing belt guided by the nip plate, so that a developer image is thermally fixed onto the recording sheet. This fixing device also includes a second frame, a cam, and a tension coil spring.

The second frame holds the nip plate and the fusing belt such that the nip plate and the fusing belt are movable between a pressure contact position at which the nip plate and the fusing belt are in pressure contact with the pressure roller and a separation position at which the nip plate and the fusing belt are positioned away from the pressure roller. The cam is angularly rotatable about an axis of a shaft by approximately 90 degrees in one direction and an opposite direction through an operation by a user. The cam includes a first release surface and a complete release surface. The tension coil spring urges the nip plate and the fusing belt in an urging direction toward the pressure roller through an arm member connected to the second frame.

As a result of rotation, by the user, of the cam by about 90 degrees in the one direction from a first posture to a third posture of the cam, the first release surface contacts the arm member to displace the nip plate and the fusing belt to the separation position against an urging force of the tension coil spring. On the other hand, as a result of rotation, by the user, of the cam by about 90 degrees in the opposite direction from the third posture to the first posture of the cam, the first release surface and the complete release surface are separated from the arm member, and the nip plate and the fusing belt those urged by the tension coil spring are displaced to the pressure contact position.

SUMMARY

In order to improve convenience of the fixing device, automatic displacement of the nip plate and the fusing belt between the pressure contact position and the separation position is conceivable in the fixing device disclosed in '660 Publication. However, such automatic displacement of the nip plate and the fusing belt may generate abnormal noise due to collision of components constituting the fixing device.

More specifically, a drive source and a power transmission section may be newly added to the fixing device disclosed in the fixing device disclosed in '660 Publication to rotate the cam in order to automatically displace the nip plate and the fusing belt between the pressure contact position and the separation position. However, the power transmission section may include gears in meshing engagement therebetween, a shaft hole, and a shaft fitting with the shaft hole, and gaps may be provided between the gears and between the shaft hole and the shaft. By the rotation of the cam, a contacting position between the arm member and the first release surface or the complete release surface may be displaced with respect to an axis of the cam. Therefore, a direction of rotating the cam about an axis of the shaft by the urging force of the tension coil spring may be abruptly changed from the one direction to the opposite direction or from the opposite direction to the one direction in accordance with the change in posture of the cam. In this case, gaps between the components in the power transmission section may be suddenly eliminated, which may cause abnormal noise such as noise of collision of the components.

In view of the foregoing, it is an object of the disclosure to provide an image forming apparatus capable of suppressing generation of abnormal noise and enhancing convenience.

In order to attain the above and other objects, according to one aspect, the disclosure provides an image forming apparatus including: a first fixing member; a second fixing member; a holding member; a cam member; an urging member; a drive source; a transmission section; and a controller. The second fixing member is configured to nip and heat a recording sheet in cooperation with the first fixing member to fix a developer image onto the recording sheet. The holding member holds the second fixing member such that the second fixing member can be displaced between a pressure contact position and a separation position. The second fixing member in the pressure contact position is in pressure contact with the first fixing member. The second fixing member in the separation position is positioned away from the first fixing member. The cam member is rotatable about a rotation axis in a first direction and a second direction opposite to the first direction. The cam member has a cam surface. A distance between the cam surface and the rotation axis is reduced in the second direction. A part of the cam surface is in contact with the holding member at a first position in a state where the second fixing member is displaced to the separation position, and the part of the cam surface is positioned away from the holding member at a second position in a state where the second fixing member is displaced to the pressure contact position. The first direction is opposite to a direction from the first position to the second position about the rotation axis with a smaller central angle. The urging member urges the second fixing member in an urging direction such that the second fixing member moves toward the first fixing member. The drive source is configured to generate a driving force for rotating the cam member in the first direction and in the second direction. The transmission section is configured to transmit the driving force to the cam member. The controller is configured to control the drive source: to provide rotation of the cam member in the first direction, the rotation of the cam member in the first direction permitting the cam surface to be moved away from the holding member to displace the second fixing member urged by an urging force of the urging member to the pressure contact position; and to provide rotation of the cam member in the second direction, the rotation of the cam member in the second direction permitting the cam surface to be brought into contact with the holding member to displace the second fixing member to the separation position against the urging force of the urging member.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

<Embodiment>

Figure 1:
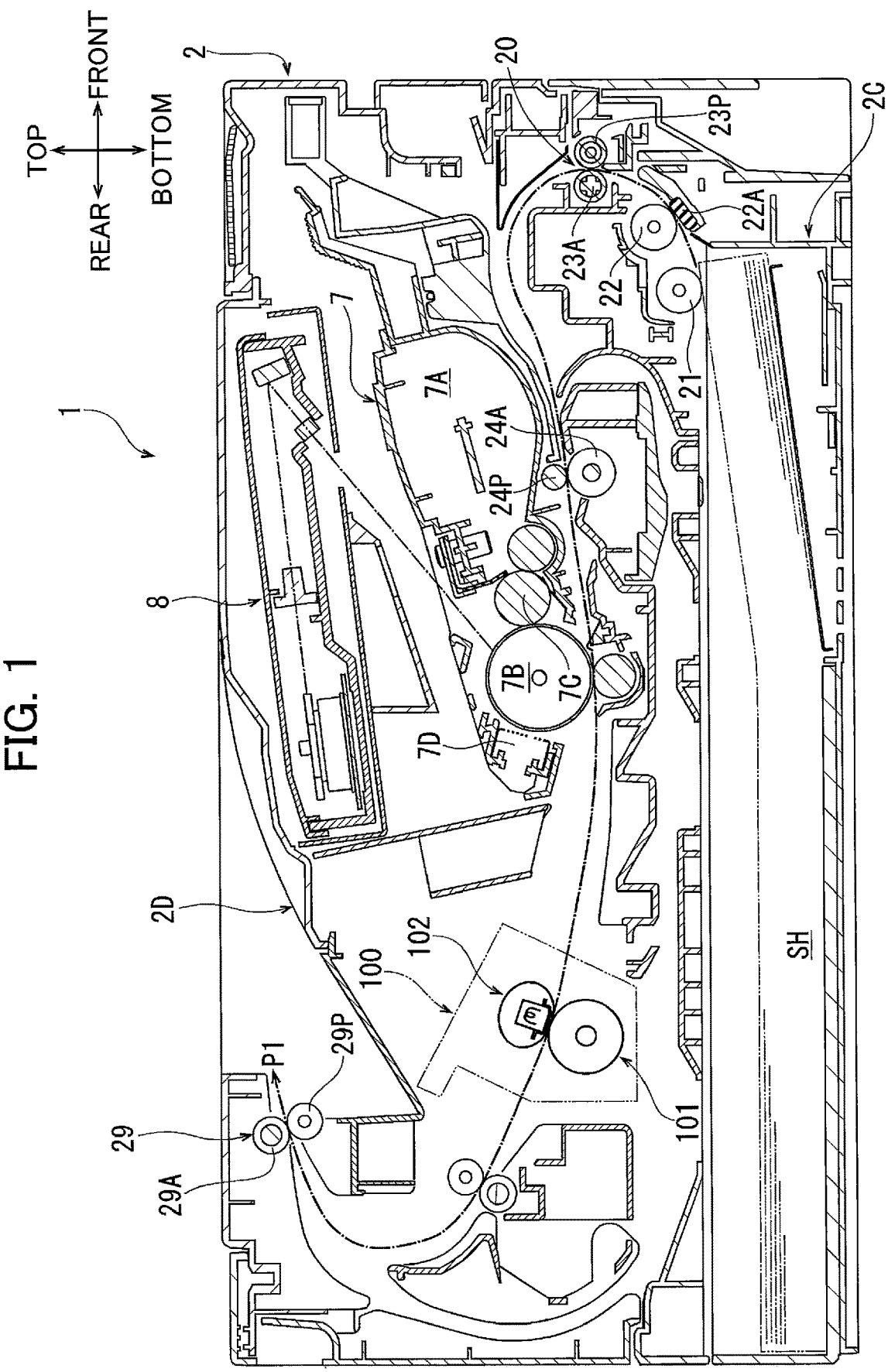
FIG. 1 is a schematic cross-sectional view of an image forming apparatus provided with a fixing device according to one embodiment.

First, a general structure of an image forming apparatus 1 according to one embodiment will be described with reference to FIG. 1. The image forming apparatus 1 illustrated in FIG. 1 is provided with a fixing device 100. A detailed structure of the fixing device 100 will be described later while referring to FIGS. 2 to 19.

The image forming apparatus 1 is an electrophotographic laser printer configured to form an image on a recording sheet SH.

In FIG. 1, a right side of the drawing sheet is defined as a front side of the image forming apparatus 1. A left side of the image forming apparatus 1 is based on the perspective of a user viewing the image forming apparatus 1 from the front side. That is, a near side of the drawing sheet is defined as the left side of the image forming apparatus 1. An up-down direction, a front-rear direction, and a left-right direction are defined on a basis of the above definition. Further, directions indicated in each figure are based on the directions in FIG. 1.

<General Structure of Image Forming Apparatus>

As illustrated in FIG. 1, the image forming apparatus 1 includes a main body 2, a supply section 20, a process cartridge 7, a scanner section 8, the fixing device 100, and a discharge section 29.

The main body 2 includes a housing, and a frame member (not illustrated) provided in the housing. A sheet cassette 2C is positioned at a lower portion of the main body 2. The sheet cassette 2C is attachable to and detachable from the main body 2. A stack of recording sheets SH is accommodated in the sheet cassette 2C. In the present embodiment, the recording sheet SH may be a sheet of paper, an OHP sheet, an envelope, and the like.

A discharge tray 2D is provided at an upper surface of the main body 2. The discharge tray 2D is adapted to receive a recording sheet SH on which an image has been formed.

The supply section 20, the process cartridge 7, the scanner section 8, the fixing device 100, and the discharge section 29 are disposed inside the main body 2 at positions above the sheet cassette 2C, and are assembled to the frame member (not illustrated) of the main body 2.

A conveying passage P1 is provided in the main body 2, leading from a front end portion of the sheet cassette 2C to the discharge tray 2D. Specifically, the conveying passage P1 passes through the supply section 20 while U-turning upward from the front end portion of the sheet cassette 2C, and extends rearward in a substantially horizontal direction to pass through the process cartridge 7 and the fixing device 100, and then, U-turns upward to reach the discharge tray 2D through the discharge section 29.

The supply section 20 includes a supply roller 21, a separation roller 22, a separation pad 22A, a feed roller 23A, a pinch roller 23P, a registration roller 24A, and a pinch roller 24P. Each recording sheet SH accommodated in the sheet cassette 2C is supplied to the conveying passage P1 by the supply roller 21, the separation roller 22, and the separation pad 22A. The feed roller 23A, the pinch roller 23P, the registration roller 24A, and the pinch roller 24P are positioned along the conveying passage P1. The recording sheet SH supplied to the conveying passage P1 is conveyed toward the process cartridge 7 by the feed roller 23A, the pinch roller 23P, the registration roller 24A, and the pinch roller 24P.

The process cartridge 7 includes a toner container 7A, a photosensitive drum 7B, a developing roller 7C, and a charger 7D.

The scanner section 8 is positioned above the process cartridge 7. The scanner section 8 includes a laser light source, a polygon mirror, an f0 lens, and a reflection mirror. The scanner section 8 is adapted to irradiate laser beam to the photosensitive drum 7B.

A surface of the photosensitive drum 7B is uniformly charged with positive polarity by the charger 7D while the photosensitive drum 7B rotates. Subsequently, the surface of the photosensitive drum 7B is exposed to laser beam irradiated from the scanner section 8 at a high scanning speed. In this way, an electrostatic latent image corresponding to an image to be formed on the recording sheet SH is formed on the surface of the photosensitive drum 7B. The developing roller 7C is adapted to supply developer (toner) accommodated in the toner container 7A to the surface of the photosensitive drum 7B. Accordingly, a developer image corresponding to the electrostatic latent image is formed on the surface of the photosensitive drum 7B. The developer image is then transferred onto the recording sheet SH passing through the process cartridge 7.

The fixing device 100 is positioned rearward of the process cartridge 7. The fixing device 100 includes a heating belt unit 102, and a pressure roller 101. The heating belt unit 102 is positioned above the conveying passage P1, while the pressure roller 101 is positioned below the conveying passage P1. The pressure roller 101 is positioned in confrontation with the heating belt unit 102, with the conveying passage P1 interposed between the heating belt unit 102 and the pressure roller 101. The recording sheet SH is heated and pressed while being nipped between the pressure roller 101 and the heating belt unit 102, so that the developer image can be thermally fixed onto the recording sheet SH.

The discharge section 29 includes a discharge roller 29A, and a discharge pinch roller 29P. The recording sheet SH on which the image is fixed is discharged onto the discharge tray 2D by the discharge roller 29A and the discharge pinch roller 29P.

Figure 2:
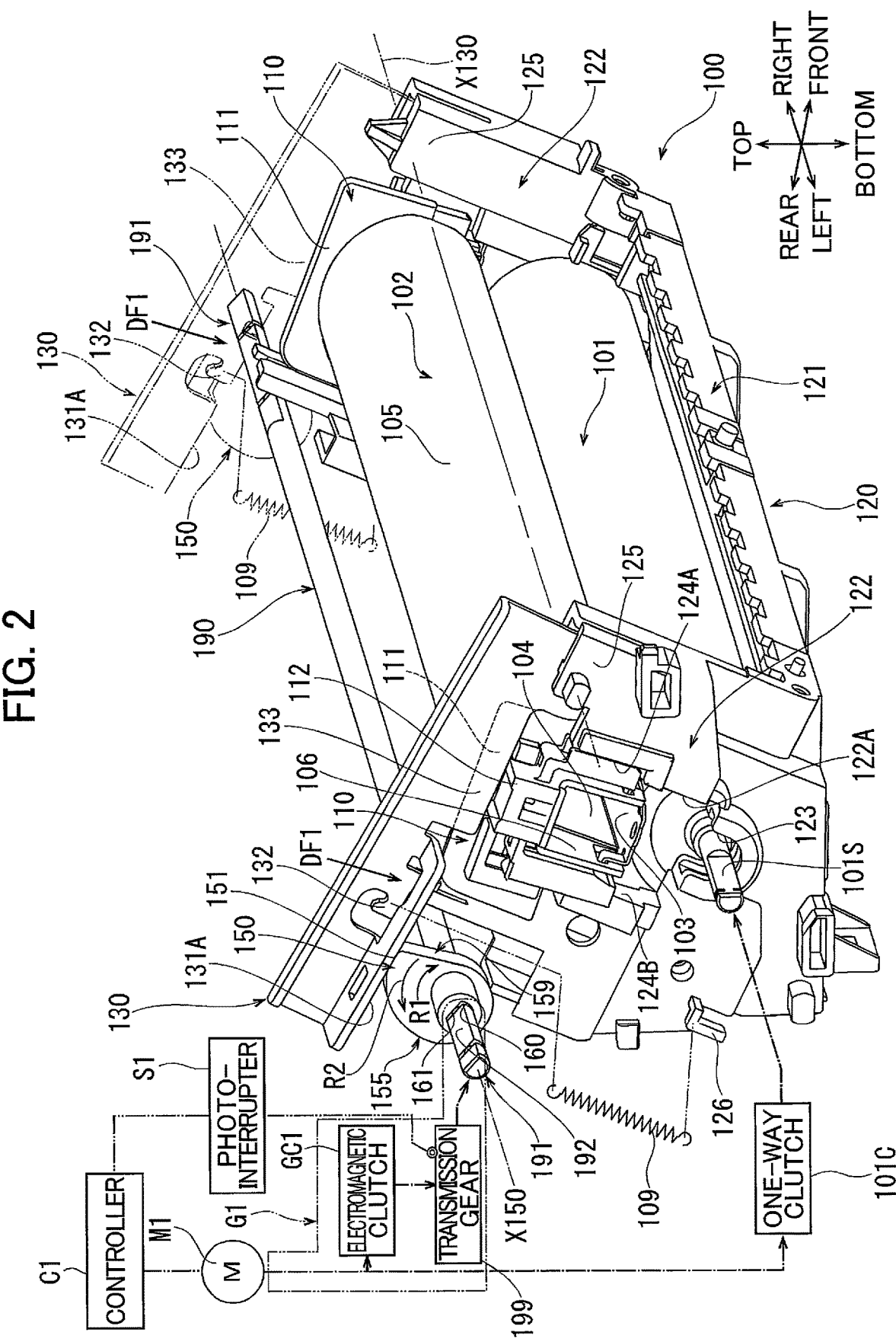
FIG. 2 is a perspective view of the fixing device according to the embodiment.

As illustrated in FIG. 2, the image forming apparatus 1 is provided with a controller C1, a motor M1, a transmission section G1, and a photointerrupter S1.

The controller C1 is configured of a microcomputer. The controller C1 primarily includes a CPU, a ROM, and a RAM (which are not illustrated). The ROM stores programs by which the CPU can control various operations of the image forming apparatus 1 and execute an identification process. The RAM is used as a storage area for temporarily storing data and signals used when the CPU executes the programs, or as a work area for data processing. The controller C1 is configured to control the entire image forming apparatus 1, that is, not only the fixing device 100 but also the supply section 20, the process cartridge 7, the scanner section 8, and the discharge section 29. The motor M1 is an example of a drive source. The motor M1 may be exclusively used for the fixing device 100, or may also be used as a drive source for the supply section 20, the process cartridge 7, and the discharge section 29. In the present embodiment, a stepping motor is used as the motor M1. The motor M1 is rotatable in a normal rotation direction and a reverse rotation direction under the control of the controller C1. The photointerrupter S1 is connected to the controller C1. The photointerrupter S1 is an example of a sensor.

As illustrated in FIG. 2, the transmission section G1 primarily includes an electromagnetic clutch GC1, a gear train (not illustrated), a transmission gear 199, and a transmission shaft 190. The gear train couples the motor M1 and an input side of the electromagnetic clutch GC1. The transmission gear 199 is coupled to an output side of the electromagnetic clutch GC1. The electromagnetic clutch GC1 is connected to the controller C1 and configured to be switched between a connection state and a disconnection state under the control of the controller C1. The transmission shaft 190 is a shaft member formed of steel, for example, having high strength and rigidity. The transmission shaft 190 has left and right shaft portions 191 at its left and right end portions, respectively.

<Detailed Structure of Fixing Device>

Figure 3:
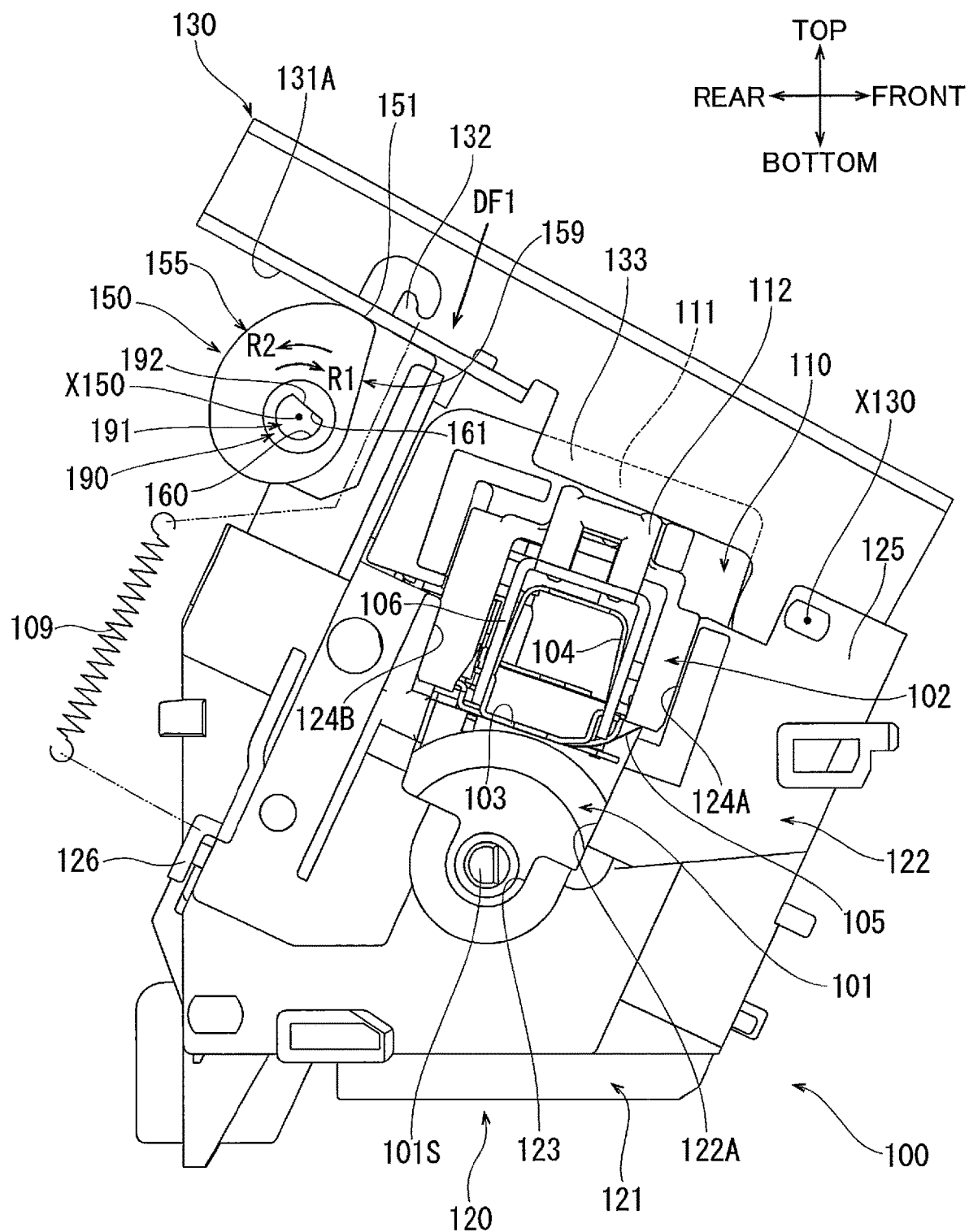
FIG. 3 is a side view of the fixing device according to the embodiment.

As illustrated in FIGS. 2 and 3, the fixing device 100 includes the pressure roller 101, the heating belt unit 102, a fixing frame 120, a pair of left and right holding members 130, a pair of left and right cam members 150, and a pair of left and right tension coil springs 109.

The pressure roller 101 is an example of a first fixing member. The heating belt unit 102 is an example of a second fixing member. The tension coil spring 109 is an example of an urging member.

The left holding member 130 and the right holding member 130 are symmetrical in shape to each other. Therefore, illustration of the right holding member 130 is simplified. Further, the left cam member 150 and the right cam member 150 are symmetrical in shape to each other. Therefore, illustration of the right cam member 150 is simplified.

As illustrated in FIGS. 2 and 3, the fixing frame 120 includes a base portion 121, and a pair of left and right side wall portions 122. The base portion 121 is elongated in the left-right direction. The base portion 121 is supported by the frame member (not illustrated) of the main body 2.

The left side wall portion 122 is connected to a left end portion of the base portion 121. The left side wall portion 122 protrudes upward from the left end portion of the base portion 121 and extends in the front-rear direction. As illustrated in FIG. 2, the right side wall portion 122 is connected to a right end portion of the base portion 121. The right side wall portion 122 protrudes upward from the right end portion of the base portion 121 and extends in the front-rear direction. The left side wall portion 122 and the right side wall portion 122 are symmetrical in shape to each other. Therefore, illustration of the right side wall portion 122 is simplified.

As illustrated in FIGS. 2 and 3, the left and right side wall portions 122 each have a recessed portion 122A recessed rearward and downward from an upper edge thereof.

Further, each of the left and right side wall portions 122 has a pressure-roller support portion 123 at a lower portion of the recessed portion 122A, and liner guide portions 124A and 124B at an upper portion of the recessed portion 122A.

Further, each of the left and right side wall portions 122 has a holding-member support portion 125 at an upper-front corner portion thereof. A hook 126 is provided at each of the left and right side wall portions 122, protruding downward from a position slightly upward from a lower-rear corner portion thereof.

The pressure roller 101 is a roller rotatable together with a rotation shaft 101S extending in the left-right direction. The rotation shaft 101S is rotatably supported by the pressure-roller support portions 123 of the left and right side wall portions 122 through bearings (not illustrated).

As illustrated in FIG. 2, the rotation shaft 101S has a left end portion coupled to the motor M1 through a planetary-gear type one-way clutch 101C. Although not illustrated, the one-way clutch 101C includes an input gear to which a driving force of the motor M1 is transmitted, an output gear positioned away from the input gear and coupled to the rotation shaft 101S, an arm swingably movable about a rotation axis of the input gear, and a planetary gear supported at a distal end portion of the arm so as to rotate about its own rotation axis and constantly meshing with the input gear. When the motor M1 rotates in the normal rotation direction, the planetary gear is displaced to a position capable of meshing with the output gear, so that the driving force of the motor M1 is transmitted to the rotation shaft 101S upon meshing of the planetary gear with the output gear. As a result, the pressure roller 101 rotates in a counterclockwise direction in FIG. 4. On the other hand, when the motor M1 rotates in the reverse rotation direction, the planetary gear is displaced to a position separated from the output gear, so that transmission of the driving force from the motor M1 to the rotation shaft 101S is interrupted. As a result, the rotation of the pressure roller 101 is halted.

Figure 4:
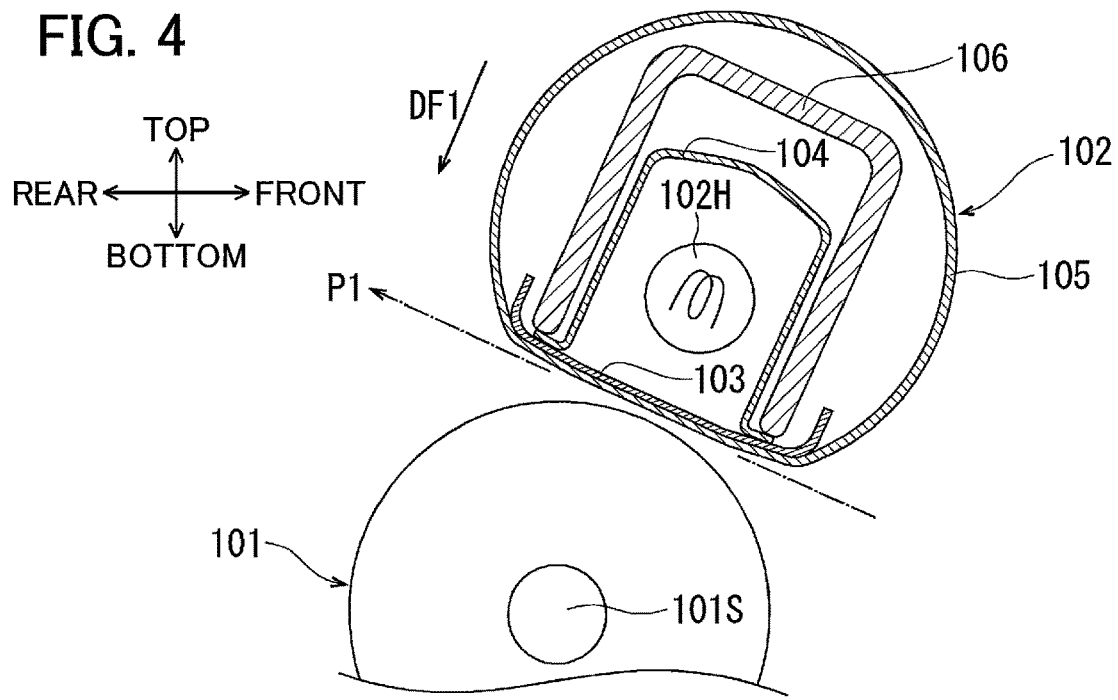
FIG. 4 is a schematic cross-sectional view of the fixing device according to the embodiment, illustrating a state where a second fixing member is at a separation position.

The heating belt unit 102 includes a fusing belt 105, a heater 102H (which are illustrated in FIG. 4), a nip plate 103, a reflection plate 104, a stay 106 (which are illustrated in FIGS. 2 to 4), and a pair of left and right guide members 110 (illustrated in FIGS. 2 and 3). The left guide member 110 and the right guide member 110 are symmetrical in shape to each other. Therefore, illustration of the right guide member 110 is simplified.

As illustrated in FIG. 4, the fusing belt 105 is an endless belt having heat resistance and flexibility. The fusing belt 105 has a cylindrical shape and is elongated in the left-right direction. The fusing belt 105 is made of stainless steel, for example. The fusing belt 105 has an outer peripheral surface on which fluorine resin is coated.

Although not illustrated, both left and right end portions of the fusing belt 105 are guided by the left and right guide members 110, respectively, thereby allowing the fusing belt 105 to rotate. The fusing belt 105 provides an internal space in which the heater 102H, the nip plate 103, the reflection plate 104, and the stay 106 are disposed.

The heater 102H is a halogen heater, for example, and is adapted to generate radiant heat to heat the nip plate 103.

As illustrated in FIGS. 2 to 4, the nip plate 103 is disposed above and in confrontation with the pressure roller 101 such that an inner peripheral surface of the fusing belt 105 is in sliding contact with the nip plate 103. The nip plate 103 is a plate-like member that receives radiant heat from the heater 102H and transmits the received heat to the fusing belt 105 and, eventually, to a developer image on a recording sheet SH. The nip plate 103 is formed by bending an aluminum plate, for example, having high thermal conductivity.

The reflection plate 104 surrounds the heater 102H and is spaced away from the heater 102H at a predetermined interval. The reflection plate 104 is adapted to reflect, toward the nip plate 103, radiant heat emitted from the heater 102H in a direction away from the nip plate 103. The reflection plate 104 is formed into a substantially U-shape in cross-section by bending an aluminum plate, for example, having high reflectance with respect to infrared or far-infrared rays.

The stay 106 has a substantially U-shaped cross-section in conformance with an outer shape of the reflection plate 104. The stay 106 is disposed so as to surround the reflection plate 104. The stay 106 supports front and rear end portions of the nip plate 103 through the reflection plate 104 for ensuring rigidity of the nip plate 103. The stay 106 is formed by bending a steel plate, for example, having rigidity higher than that of the nip plate 103.

As illustrated in FIGS. 2 and 3, the left and right guide members 110 integrally support left and right end portions of the respective heater 102H, nip plate 103, reflection plate 104, and stay 106. The guide members 110 are made of a thermally insulating material, such as resin.

The left guide member 110 is interposed between the liner guide portions 124A and 124B of the left side wall portion 122 in a state where the left guide member 110 is entered into the recessed portion 122A of the left side wall portion 122. Similarly, the right guide member 110 is interposed between the liner guide portions 124A and 124B of the right side wall portion 122 in a state where the right guide member 110 is entered into the recessed portion 122A of the right side wall portion 122. The left and right guide members 110 can be vertically linearly moved along the recessed portions 122A of the respective left and right side wall portions 122 while being guided by the linear guide portions 124A and 124B of the respective left and right side wall portions 122. The fusing belt 105, the heater 102H, the nip plate 103, the reflection plate 104, and the stay 106 can also be linearly moved toward and away from the pressure roller 101 in accordance with the linear movement of the left and right guide members 110, as illustrated in FIGS. 4 to 6.

In a state where the heating belt unit 102 is at a position illustrated in FIG. 4, the nip plate 103 and the fusing belt 105 are separated from the pressure roller 101. In a state where the heating belt unit 102 is at a position illustrated in FIG. 5, the nip plate 103 and the fusing belt 105 are in pressure contact with the pressure roller 101 so that a part of an outer peripheral surface of the pressure roller 101 is pressed and deformed. In a state where the heating belt unit 102 is at a position illustrated in FIG. 6, the nip plate 103 and the fusing belt 105 are in pressure contact with the pressure roller 101 so that a part of the outer peripheral surface of the pressure roller 101 is pressed and deformed further than in the state of FIG. 5.

The position of the heating belt unit 102 illustrated in FIG. 4 will be referred to as a separation position where the heating belt unit 102 is positioned away from the pressure roller 101. The position of the heating belt unit 102 illustrated in FIG. 6 will be referred to as a pressure contact position where the heating belt unit 102 is in pressure contact with the pressure roller 101. The pressure contact position is a position for fixing a developer image on the recording sheet SH of a type having a general thickness, such as a paper sheet, an OHP sheet, and the like. The position of the heating belt unit 102 illustrated in FIG. 5 will be referred to as a low-pressure contact position where the heating belt unit 102 is in pressure contact with the pressure roller 101 with a lower pressure force than that at the pressure contact position of FIG. 6. The low-pressure contact position is a position for fixing a developer image on the recording sheet SH of a type having a greater thickness than a general sheet, such as an envelope SH1.

Figure 5:
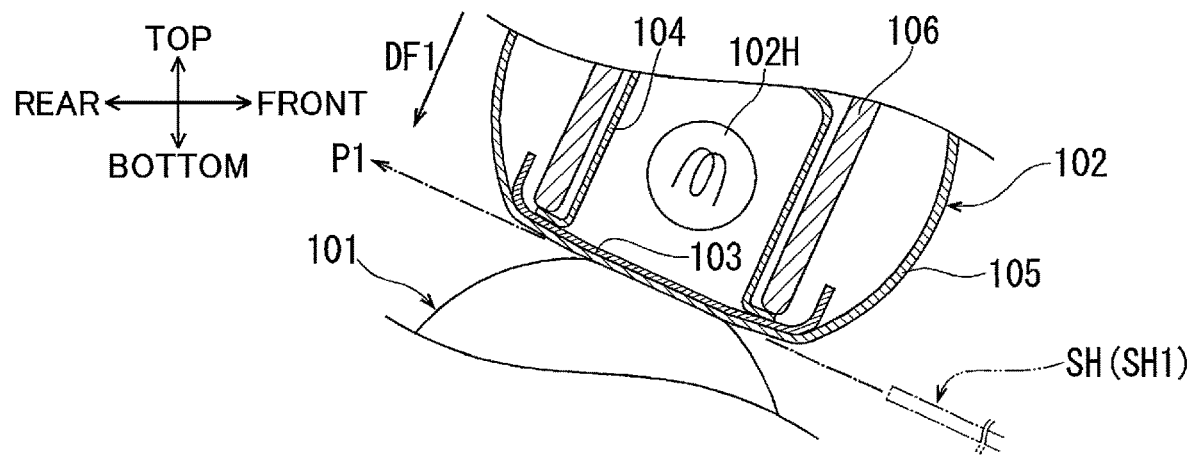
FIG. 5 is a schematic cross-sectional view of the fixing device according to the embodiment, illustrating a state where the second fixing member is at a low-pressure contact position.
Figure 6:
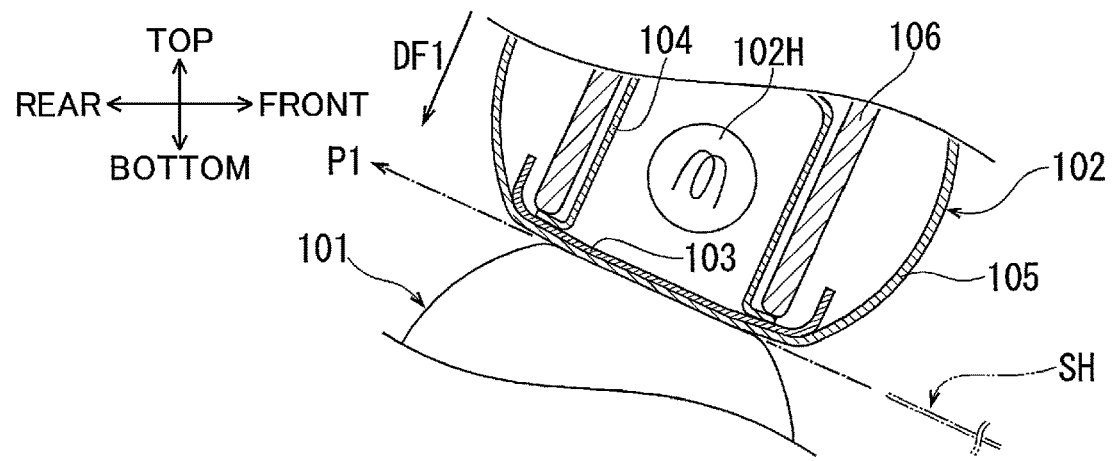
FIG. 6 is a schematic cross-sectional view of the fixing device according to the embodiment, illustrating a state where the second fixing member is at a pressure contact position.

When the pressure roller 101 rotates in a state where the heating belt unit 102 is at the pressure contact position of FIG. 6 or at the low-pressure contact position of FIG. 5, the fusing belt 105 rotates following the rotation of the pressure roller 101, while contacting the pressure roller 101.

As illustrated in FIGS. 2 and 3, the left holding member 130 has a front end portion protruding downward and entering inside the holding-member support portion 125 of the left side wall portion 122. Similarly, the right holding member 130 has a front end portion protruding downward and entering inside the holding-member support portion 125 of the right side wall portion 122. The left and right holding members 130 are supported by the respective left and right holding-member support portions 125 so as to be pivotally movable about a pivot axis X130.

Each holding member 130 has a rear end portion that is bent into a substantially L-shape in cross-section. The L-shaped bent portion has a downward-facing surface serving as a contact surface 131A. Further, a hook 132 is formed at the rear end portion of each holding member 130.

Each holding member 130 has an engagement portion 133 positioned between the contact surface 131A and the pivot axis X130. The engagement portion 133 is in engagement with an upper end portion 111 of the guide member 110. Each guide member 110 has a pressed portion 112 in the vicinity of the upper end portion 111. The pressed portion 112 has a block shape that protrudes outward in the left-right direction. The engagement portion 133 has a lower edge that is in abutment with the pressed portion 112.

When the holding members 130 pivotally move in the clockwise direction in FIG. 3, the engagement portions 133 of the holding members 130 pull the upper end portions 111 of the guide members 110 upward, respectively. As a result, the heating belt unit 102 is displaced toward the separation position of FIG. 4.

On the other hand, when the holding members 130 pivotally move in the counterclockwise direction in FIG. 3, the lower edges of the engagement portions 133 of the holding members 130 push the pressed portions 112 of the guide members 110 downward, respectively. As a result, the heating belt unit 102 is displaced toward the low-pressure contact position of FIG. 5, and further displaced toward the pressure contact position of FIG. 6. That is, the holding members 130 hold the heating belt unit 102 such that the heating belt unit 102 can be displaced between the separation position illustrated in FIG. 4 and the pressure contact position illustrated in FIG. 6.

As illustrated in FIGS. 2 and 3, the left tension coil spring 109 has an upper end portion attached to the hook 132 of the left holding member 130, and a lower end portion attached to the hook 126 of the left side wall portion 122. Similarly, although illustrated is simplified in FIG. 2, the right tension coil spring 109 has an upper end portion attached to the hook 132 of the right holding member 130, and a lower end portion attached to the hook 126 of the right side wall portion 122.

Each tension coil spring 109 urges the heating belt unit 102 in an urging direction DF1 in which the heating belt unit 102 moves toward the pressure roller 101. The urging direction DF1 is a direction in which the holding member 130 moves toward a cam surface 155 of the corresponding cam member 150. The urging direction DF1 extends in a direction substantially parallel to a direction in which the recessed portion 122A of the side wall portion 122 is recessed. In other words, the urging direction DF1 is inclined downward and rearward.

Figure 7:
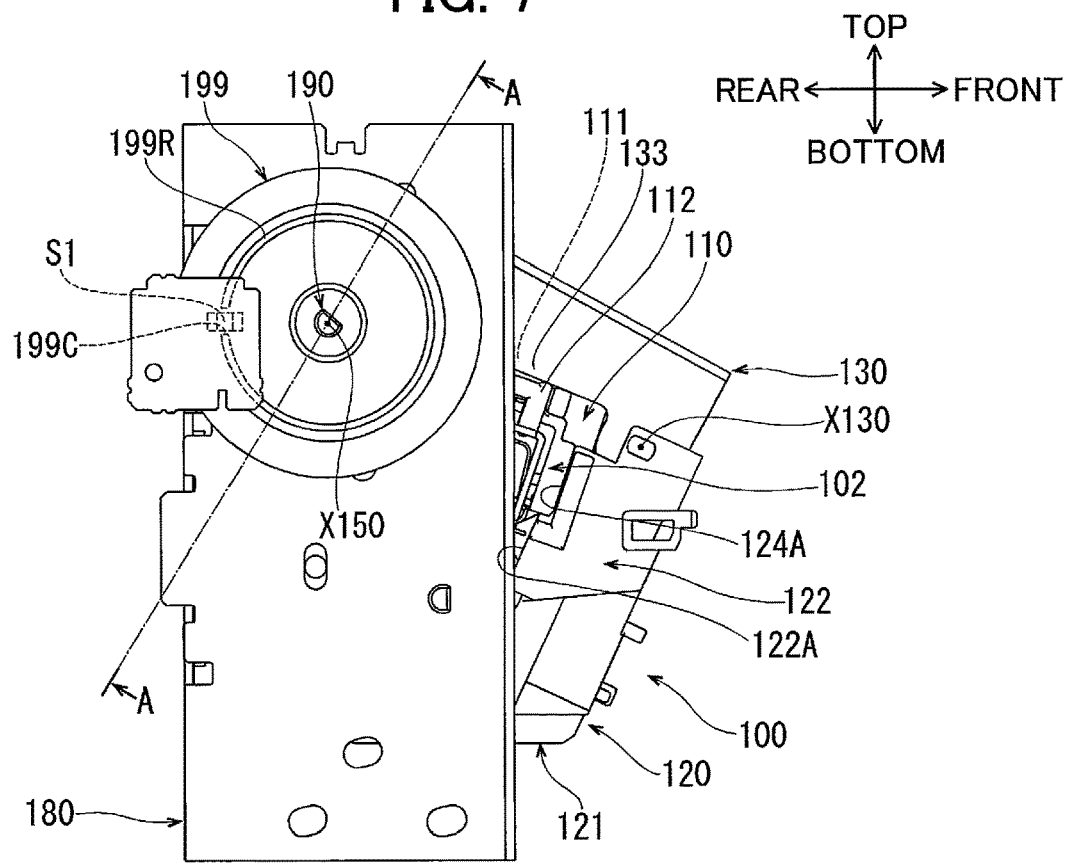
FIG. 7 is a side view of a side frame member, a transmission gear, and a sensor provided in the image forming apparatus according to the embodiment.
Figure 8:
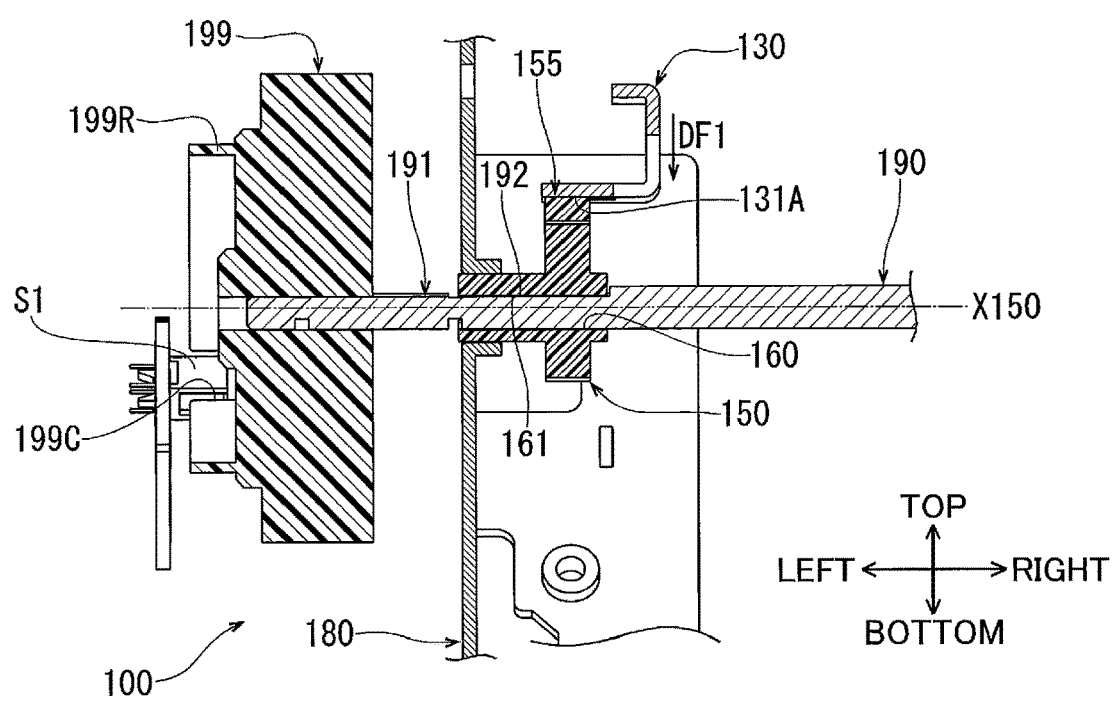
FIG. 8 is a partial cross-sectional view of FIG. 7, taken along a line A-A in FIG. 7.

As illustrated in FIG. 2, the transmission shaft 190 is provided at a position above upper-rear corner portions of the respective left and right side wall portions 122 and below the contact surfaces 131A of the respective left and right holding members 130. The transmission shaft 190 is rotatably supported at a pair of left and right side frame members 180 provided in the main body 2 as illustrated in FIGS. 7 and 8. Specifically, the left and right end portions of the transmission shaft 190 are respectively supported by the left and right side frame members 180 so that the transmission shaft 190 is rotatable about a rotation axis X150 extending in the left-right direction.

Each side frame member 180 is a plate-shaped member formed of steel, for example, having high strength and rigidity. The left and right side frame members 180 extend in the front-rear direction and the up-down direction. Note that in FIGS. 7 and 8, only the left side frame member 180 is illustrated. The left side frame member 180 and the right side frame member 180 are symmetrical in shape to each other. Therefore, illustration of the right side frame member 180 is omitted.

As illustrated in FIGS. 7 and 8, the left shaft portion 191 of the transmission shaft 190 has a left end that protrudes further leftward from the left side frame member 180. The transmission gear 199 is coupled to this protruding end of the left shaft portion 191 so that the transmission shaft 190 is rotatable together with the transmission gear 199.

As illustrated in FIGS. 2 and 3, the left cam member 150 is attached to the left shaft portion 191 of the transmission shaft 190 so as to be rotatable together with the transmission shaft 190. Specifically, the left cam member 150 is fitted onto the left shaft portion 191 at a position immediately below the contact surface 131A of the left holding member 130. Similarly, the right cam member 150 is attached to the right shaft portion 191 of the transmission shaft 190 so as to be rotatable together with the transmission shaft 190. Specifically, the right cam member 150 is fitted onto the right shaft portion 191 at a position immediately below the contact surface 131A of the right holding member 130. As illustrated in FIG. 8, the left side frame member 180 is positioned between the left cam member 150 and the transmission gear 199.

When the motor M1 rotates in the normal rotation direction under the control of the controller C1, and the electromagnetic clutch GC1 is switched to the connection state under the control of the controller C1, the transmission section G1 transmits the driving force of the motor M1 to the cam members 150 to rotate the cam members 150 about the rotation axis X150 in a first direction R1.

On the other hand, when the motor M1 rotates in the reverse rotation direction under the control of the controller C1, and the electromagnetic clutch GC1 is switched to the connection state under the control of the controller C1, the transmission section G1 transmits the driving force of the motor M1 to the cam members 150 to rotate the cam members 150 about the rotation axis X150 in a second direction R2 which is opposite to the first direction R1.

Specifically, the first direction R1 is a clockwise direction in FIG. 3, while the second direction R2 is a counterclockwise direction in FIG. 3.

As illustrated in FIGS. 9 to 17, each cam member 150 includes a cam surface 155 and a non-used surface 159. The cam surface 155 is a part of a peripheral surface of the cam member 150 that can contact the contact surface 131A of the corresponding holding member 130. When viewed along the rotation axis X150, the contact surface 131A of the holding member 130 with which the corresponding cam surface 155 is in contact linearly extends so as to be inclined upward and rearward.

The cam surface 155 is configured such that a distance between the cam surface 155 and the rotation axis X150 is reduced in the second direction R2. Here, the configuration of "a distance between the cam surface 155 and the rotation axis X150 is reduced in the second direction R2" includes a configuration where the cam surface 155 has a portion to which a distance from the rotation axis X150 is uniform and the portion extends about the rotation axis X150 with a certain length. However, a configuration where the cam surface 155 has a portion to which a distance from the rotation axis X150 is increased in the second direction R2 is not regarded as the configuration of "a distance between the cam surface 155 and the rotation axis X150 is reduced in the second direction R2".

The non-used surface 159 is a remaining part of the peripheral surface and is positioned between one and the other ends of the cam surface 155. The non-used surface 159 substantially linearly extends between the one end and the other end of the cam surface 155. The controller C1 controls the motor M1 and the electromagnetic clutch GC1 to rotate the cam members 150 in the first direction R1 and the second direction R2 as long as the non-used surfaces 159 of the cam members 150 do not contact the contact surfaces 131A of the corresponding holding members 130.

Figure 10:
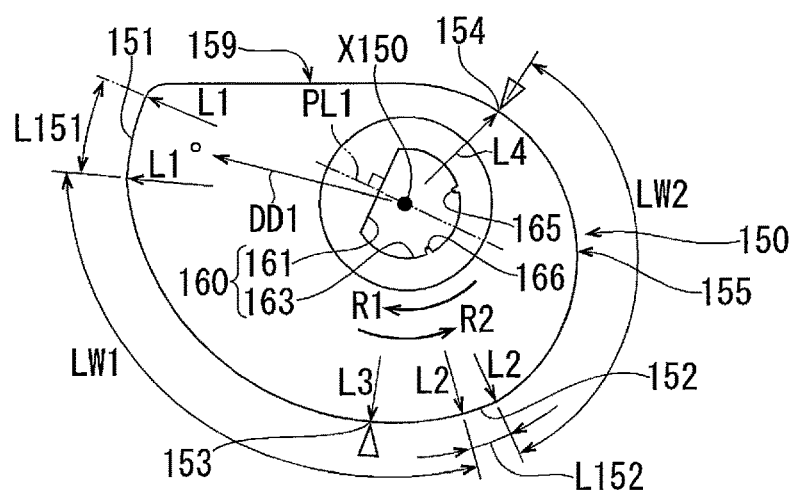
FIG. 10 is a side view of the cam member according to the embodiment.

As illustrated in FIG. 10, the cam surface 155 includes a first part 151, a second part 152, a third part 153, and a fourth part 154. The third part 153 is an example of a prescribed part.

The first part 151 is provided such that a distance between the first part 151 and the rotation axis X150 is set to a first distance L1 that is the largest distance between the rotation axis X150 and the cam surface 155. The first part 151 extends about the rotation axis X150 by a predetermined length L151 while maintaining the first distance L1 from the rotation axis X150. A connection portion between the first part 151 and the non-used surface 159 is rounded. The predetermined length L151 is an example of a first predetermined length.

The second part 152 is provided at a position away from the first part 151 about the rotation axis X150 by a predetermined distance in the second direction R2. A distance between the second part 152 and the rotation axis X150 is set to a second distance L2 that is smaller than the first distance L1. The second part 152 extends about the rotation axis X150 by a predetermined length L152 while maintaining the second distance L2 from the rotation axis X150. The predetermined length L152 is an example of a second predetermined length.

The third part 153 is provided at a position away from the second part 152 in the first direction R1 by a predetermined distance about the rotation axis X150. A distance between the third part 153 and the rotation axis X150 is set to a third distance L3 that is larger than the second distance L2.

The fourth part 154 is provided at a position away from the second part 152 in the second direction R2 by a predetermined distance about the rotation axis X150. A distance between the fourth part 154 and the rotation axis X150 is set to a fourth distance L4 that is smaller than the second distance L2.

A part of the cam surface 155 extending from the first part 151 to the third part 153 is gently curved, with the distance from the rotation axis X150 being gradually reduced in the second direction R2. Further, a part of the cam surface 155 extending from the third part 153 to the second part 152 is gently curved, with the distance from the rotation axis X150 being gradually reduced in the second direction R2. That is, a part of the cam surface 155 extending from the first part 151 to the second part 152 is gently curved such that a distance between the cam surface 155 and the rotation axis X150 is gradually reduced in the second direction. Further, a part of the cam surface 155 extending from the second part 152 to the fourth part 154 is gently curved, with the distance from the rotation axis X150 being gradually reduced in the second direction R2. The part of the cam surface 155 extending from the first part 151 to the third part 153 is an example of an intervening part. The part of the cam surface 155 extending from the first part 151 to the second part 152 is an example of a first intervening part. The part of the cam surface 155 extending from the second part 152 to the fourth part 154 is an example of a second intervening part.

In the cam surface 155, a peripheral length LW1 between the first part 151 and the second part 152 is set greater than a peripheral length LW2 between the second part 152 and the fourth part 154.

Figure 9:
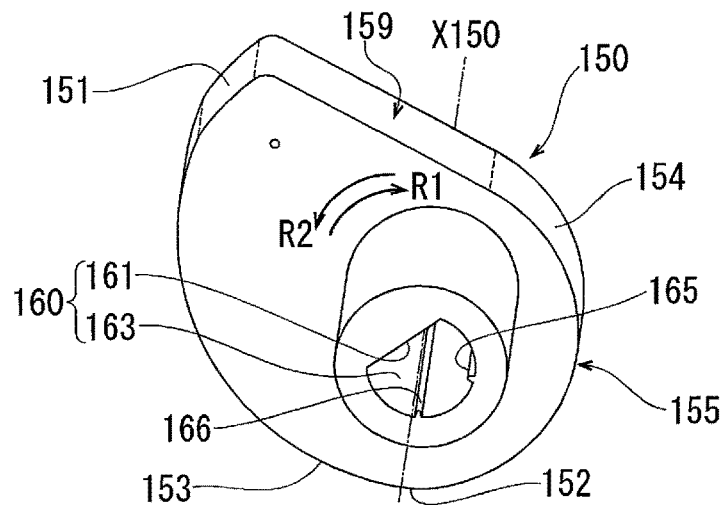
FIG. 9 is a perspective view of a cam member provided in the fixing device according to the embodiment.

As illustrated in FIGS. 9 and 10, a shaft hole 160 is formed in each cam member 150. The shaft hole 160 is centered on the rotation axis X150. In other words, the shaft hole 160 is coaxial with the rotation center X150. The shaft hole 160 has an arcuate surface portion 163 and a first flat surface portion 161 cutting away a part of a cylindrical surface to provide a substantially D-shape in cross-section. As illustrated in FIG. 10, the first flat surface portion 161 is positioned so as to cross a direction DD1 directing from the rotation axis X150 toward the first part 151.

As illustrated in FIGS. 2 and 3, the shaft portions 191 of the transmission shaft 190 are fitted into the shaft holes 160 of the respective cam members 150 to provide fitting portions therebetween. Each shaft portion 191 of the transmission shaft 190 has a substantially D-shaped cross-section conforming to the shape of the shaft hole 160 of the cam member 150. The shaft portions 191 of the transmission shaft 190 each have a second flat surface 192 in abutment with the corresponding first flat surface portion 161.

As illustrated in FIGS. 9 and 10, each shaft hole 160 has a rib-like first protrusion 165 and a rib-like second protrusion 166. The first protrusion 165 and the second protrusion 166 extend parallel to the rotation axis X150. The first protrusion 165 and the second protrusion 166 are an example of a pair of protrusions. As illustrated in FIG. 10, when viewed along the rotation axis X150, the first protrusion 165 and the second protrusion 166 protrude from the arcuate surface portion 163 toward the first flat surface portion 161 at positions opposite to each other with respect to a perpendicular line PL1 passing the rotation axis X150 and crossing the first flat surface portion 161 at right angles.

As illustrated in FIGS. 7 and 8, the photointerrupter S1 is disposed at a position opposite to a left surface of the transmission gear 199. A cylindrical rib 199R is formed on the left surface of the transmission gear 199. The rib 199R is centered on and coaxial with the rotation axis X150. The rib 199R protrudes leftward from the left surface of the transmission gear 199. A part of the rib 199R is cut out by a cutout portion 199C.

The photointerrupter S1 is connected to the controller C1. When the rib 199R interrupts a light path of the photointerrupter S1 in accordance with rotation of the transmission gear 199, the photointerrupter S1 transmits a CLOSE signal to the controller C1. On the other hand, when the cutout portion 199C is positioned on the light path in accordance with rotation of the transmission gear 199 so that the light emitted from the photointerrupter S1 passes through the cutout portion 199C, the photointerrupter S1 transmits an OPEN signal to the controller C1.

As described below in detail, the controller C1 controls the motor M1 to rotate the cam members 150 in the first direction R1. Rotation of the cam members 150 in the first direction R1 causes the cam surfaces 155 to be moved away from the corresponding contact surfaces 131A of the holding members 130. As a result, the heating belt unit 102 urged by the tension coil springs 109 is displaced to the pressure contact position of FIG. 6. On the other hand, the controller C1 controls the motor M1 to rotate the cam members 150 in the second direction R2. Rotation of the cam members 150 in the second direction R2 brings the cam surfaces 155 into contact with the corresponding contact surfaces 131A of the holding members 130. As a result, the heating belt unit 102 is displaced to the separation position of FIG. 4 against the urging force of the tension coil springs 109.

The controller C1 is configured to detect a rotational posture of the transmission gear 199 through the photointerrupter S1, thereby detecting a rotational posture of the cam members 150. Through this detection, the controller C1 detects whether or not the cam members 150 are at a position illustrated in FIG. 11, that is, whether or not the heating belt unit 102 is at the separation position of FIG. 4.

Figure 11:
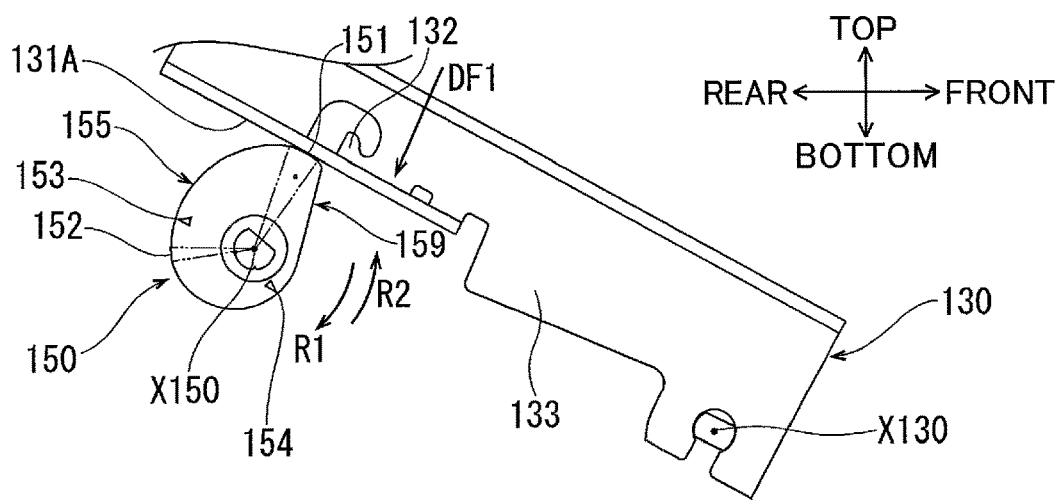
FIG. 11 is a partial side view for description how the cam member acts on a holding member of the fixing device according to the embodiment, illustrating a state where the cam member is at an original position.

Specifically, the cutout portion 199C of the transmission gear 199 is disposed at a position overlapping the light path of the photointerrupter S1 to allow the light to pass therethrough in a state where the cam member 150 is at the position illustrated in FIG. 11, that is, in a state where the first part 151 of the cam surface 155 is in contact with the corresponding contact surface 131A of the holding member 130. The rib 199R of the transmission gear 199 is disposed at a position interrupting the light path of the photointerrupter S1 in a state where the cam member 150 is not at the position illustrated in FIG. 11, that is, in a state where the first part 151 of the cam surface 155 is separated from the corresponding contact surface 131A of the holding member 130. In other words, the photointerrupter S1 detects only whether or not the first part 151 of the cam surface 155 is in contact with the contact surface 131A of the holding member 130.

In a case where the controller C1 receives the OPEN signal from the photointerrupter S1, the controller C1 determines that the cam members 150 are at the position illustrated in FIG. 11 and that the heating belt unit 102 is at the separation position of FIG. 4. On the other hand, in a case where the controller C1 receives the CLOSE signal from the photointerrupter S1, the controller C1 determines that the cam members 150 are not at the position illustrated in FIG. 11 and that the heating belt unit 102 is not at the separation position of FIG. 4.

Further, the controller C1 controls the motor M1 as a stepping motor to rotate accurately in the normal rotation direction and the reverse rotation direction under pulse signal control or the like with the position of the cam members 150 illustrated in FIG. 11 as an original position, thereby accurately changing the rotational posture of the cam members 150. In a case where the cam members 150 are displaced from the original position illustrated in FIG. 11 toward the position illustrated in FIG. 17, the controller C1 controls the cam members 150 to rotate in the first direction R1. In a case where the cam members 150 return to the original position illustrated in FIG. 11, the controller C1 controls the cam members 150 to rotate in the second direction R2.

In a state where the first parts 151 of the cam surfaces 155 are in contact with the contact surfaces 131A of the corresponding holding members 130, the cam members 150 allow the heating belt unit 102 to be displaced to the separation position of FIG. 4 against the urging force of the tension coil springs 109 as illustrated in FIGS. 2, 3, and 11, since the first distance L1 is the largest distance between the rotation axis X150 and the cam surface 155.

Figure 12:
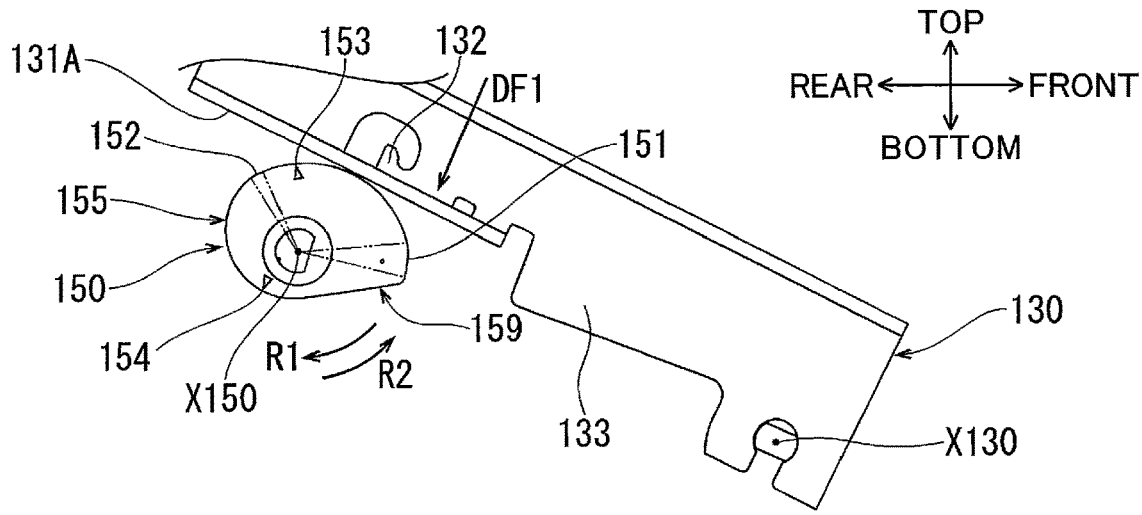
FIG. 12 is a partial side view for description how the cam member acts on the holding member according to the embodiment, illustrating a state where the cam member rotates in a first direction from the position illustrated in FIG. 11.
Figure 13:
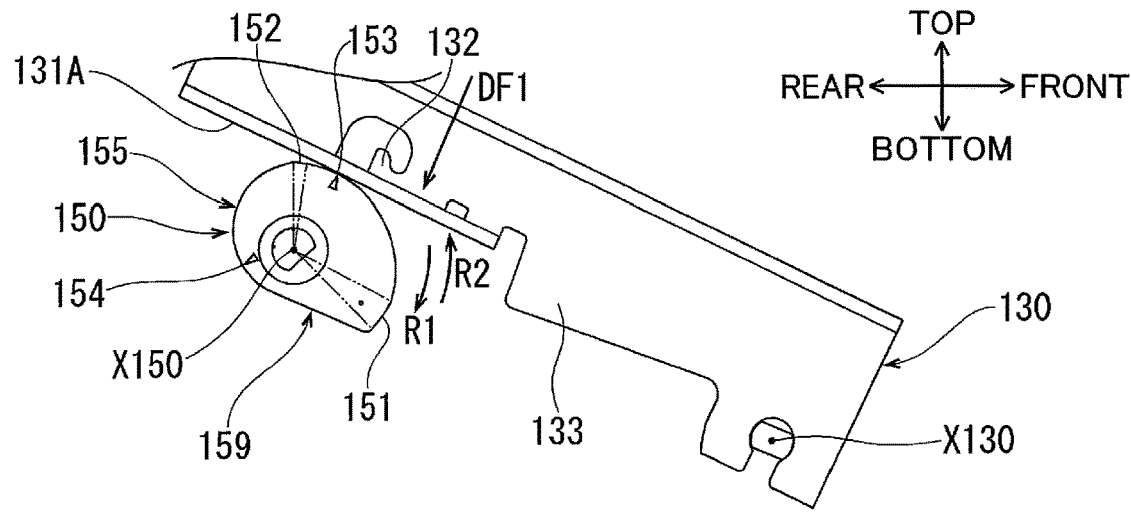
FIG. 13 is a partial side view for description how the cam member acts on the holding member according to the embodiment, illustrating a state where the cam member further rotates in the first direction from the position illustrated in FIG. 12.

As illustrated in FIGS. 12 and 13, when the controller C1 controls the motor M1 to start rotating the cam members 150 in the first direction R1, the part between the first part 151 and the second part 152 in each cam surface 155 is brought into contact with the corresponding contact surface 131A of the holding member 130. This part has a gently curved surface in which the distance from the rotation axis X150 is gradually reduced in the second direction R2. Hence, each of the holding members 130 is gradually pivotally moved in the urging direction DF1 and, thus, the heating belt unit 102 moves toward the pressure roller 101. Then, as illustrated in FIG. 13, at a timing at which the third part 153 of each cam surface 155 contacts the corresponding contact surface 131A of the holding member 130, the heating belt unit 102 is brought into contact with the pressure roller 101.

Figure 14:
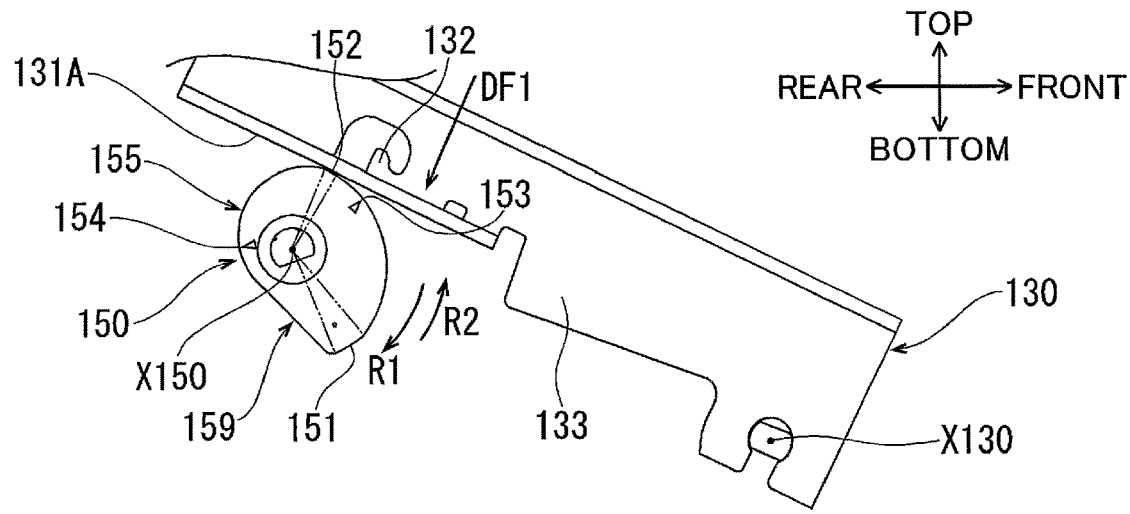
FIG. 14 is a partial side view for description how the cam member acts on the holding member according to the embodiment, illustrating a state where the cam member further rotates in the first direction from the position illustrated in FIG. 13 to provide the low-pressure contact position of the second fixing member.

As illustrated in FIG. 14, when the controller C1 controls the cam members 150 to further rotate in the first direction R1, the second part 152 of each cam surface 155 is brought into contact with the corresponding contact surface 131A of the holding member 130. In this state, each of the holding members 130 is further pivotally moved in the urging direction DF1, and the heating belt unit 102 is displaced to the low-pressure contact position of FIG. 5 while pressing and deforming a part of the outer peripheral surface of the pressure roller 101.

Figure 15:
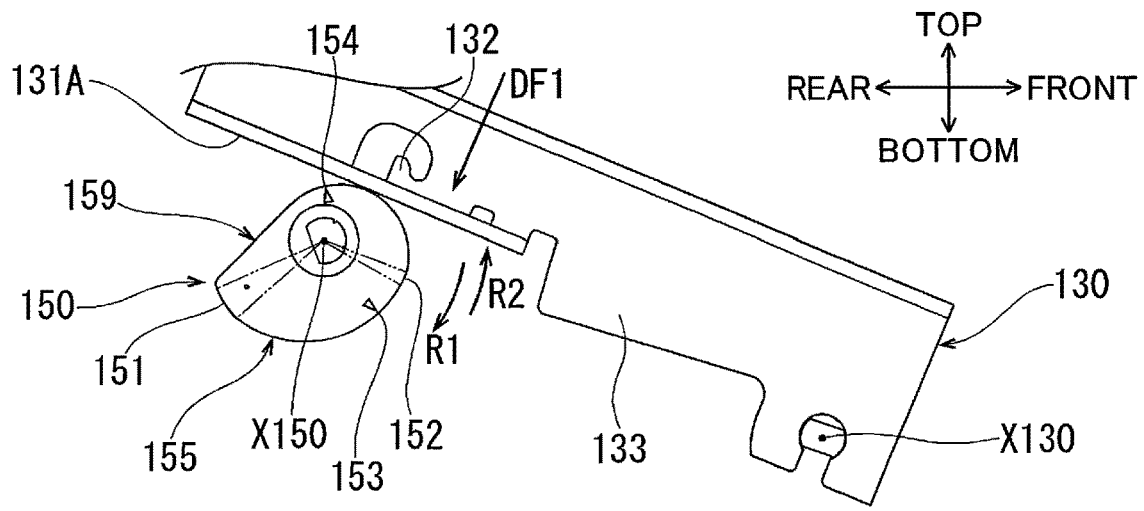
FIG. 15 is a partial side view for description how the cam member acts on the holding member according to the embodiment, illustrating a state where the cam member further rotates in the first direction from the position illustrated in FIG. 14.
Figure 16:
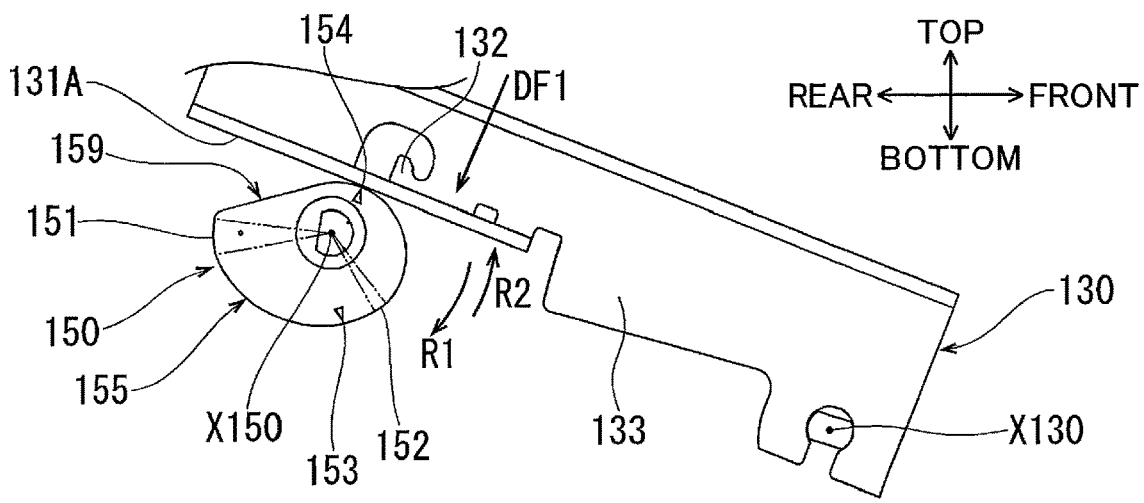
FIG. 16 is a partial side view for description how the cam member acts on the holding member according to the embodiment, illustrating a state where the cam member further rotates in the first direction from the position illustrated in FIG. 15.

As illustrated in FIGS. 15 and 16, when the controller C1 controls the cam members 150 to further rotate in the first direction R1, the part between the second part 152 and the fourth part 154 in each cam surface 155 is brought into contact with the corresponding contact surface 131A of the holding member 130. This part has a gently curved surface in which the distance from the rotation axis X150 is gradually reduced in the second direction R2. Hence, each of the holding members 130 is gradually pivotally moved in the urging direction DF1 and, thus, the heating belt unit 102 further presses and deforms a part of the outer peripheral surface of the pressure roller 101.

Then, as illustrated in FIG. 16, when the fourth part 154 of each cam surface 155 moves to a position opposed to the corresponding contact surface 131A of the holding member 130, the cam surface 155 of each cam member 150 separates from the corresponding contact surface 131A. In other words, a contact timing of the heating belt unit 102 with the pressure roller 101 is set earlier than a separation timing of the cam surfaces 155 of the cam members 150 rotating in the first direction R1 from the corresponding contact surfaces 131A of the holding members 130. Note that, in the state illustrated in FIG. 16, a minute gap is formed between the fourth part 154 and the contact surface 131A. When each of the cam members 150 further rotate in the first direction R1, the gap between the cam surface 155 and the corresponding contact surface 131A increases.

Figure 17:
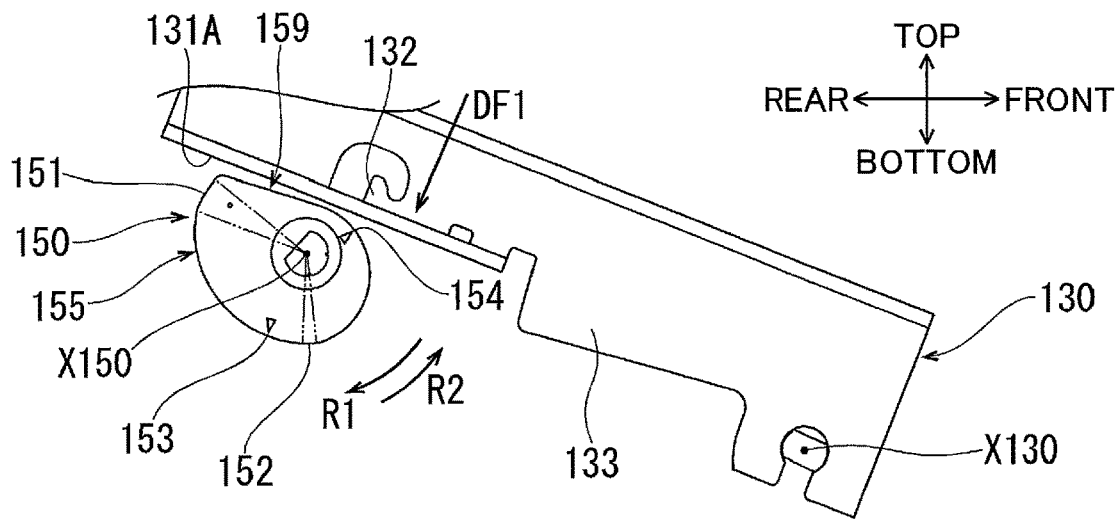
FIG. 17 is a partial side view for description how the cam member acts on the holding member according to the embodiment, illustrating a state where the cam member further rotates in the first direction from the position illustrated in FIG. 16 to provide the pressure contact position of the second fixing member.

As illustrated in FIG. 17, when the controller C1 controls the cam members 150 to further rotate in the first direction R1, the non-used surface 159 of each cam member 150 is opposed to the corresponding contact surface 131A of the holding member 130 with a gap therebetween. As a result, only the urging force of the tension coil springs 109 acts on the respective holding members 130 to displace the heating belt unit 102 to the pressure contact position of FIG. 6.

When the controller C1 controls the motor M1 to rotate the cam members 150 in the second direction R2, the cam members 150 rotate in the second direction R2 by performing the operation to rotate the cam members 150 in the first direction R1 described above in reverse, and accordingly, the holding members 130 are pivotally moved by performing the operation to pivotally move the holding members 130 in the urging direction DF1 described above in reverse. As a result, the heating belt unit 102 is displaced from the pressure contact position of FIG. 6 to the separation position of FIG. 4.

The controller C1 thus controls the heating belt unit 102 to be displaced among the separation position of FIG. 4, the low-pressure contact position of FIG. 5, and the pressure contact position of FIG. 6 depending on the state of the image forming apparatus 1 or in response to an instruction from the image forming apparatus 1.

For example, in a case where the type of the recording sheet SH is a paper sheet, the controller C1 controls the heating belt unit 102 to be displaced to the pressure contact position of FIG. 6. In a case where the recording sheet SH is an envelope, the controller C1 controls the heating belt unit 102 to be displaced to the low-pressure contact position of FIG. 5. This enables the fixing device 100 to perform a desirable fixing process according to the thickness of the recording sheet SH.

Further, for example, when the image forming apparatus 1 shifts to a sleep mode, the controller C1 controls the heating belt unit 102 to be displaced to the separation position of FIG. 4. Then, the heating belt unit 102 is displaced to the low-pressure contact position of FIG. 5 or the pressure contact position of FIG. 6 immediately before the image forming apparatus 1 starts its image forming operation. This can reduce a time period during which the pressure roller 101 is locally pressed and heated. Thus, quality in the fixing process can be maintained. Further, improvement in durability of the fixing device 100 can be achieved.

Figure 18:
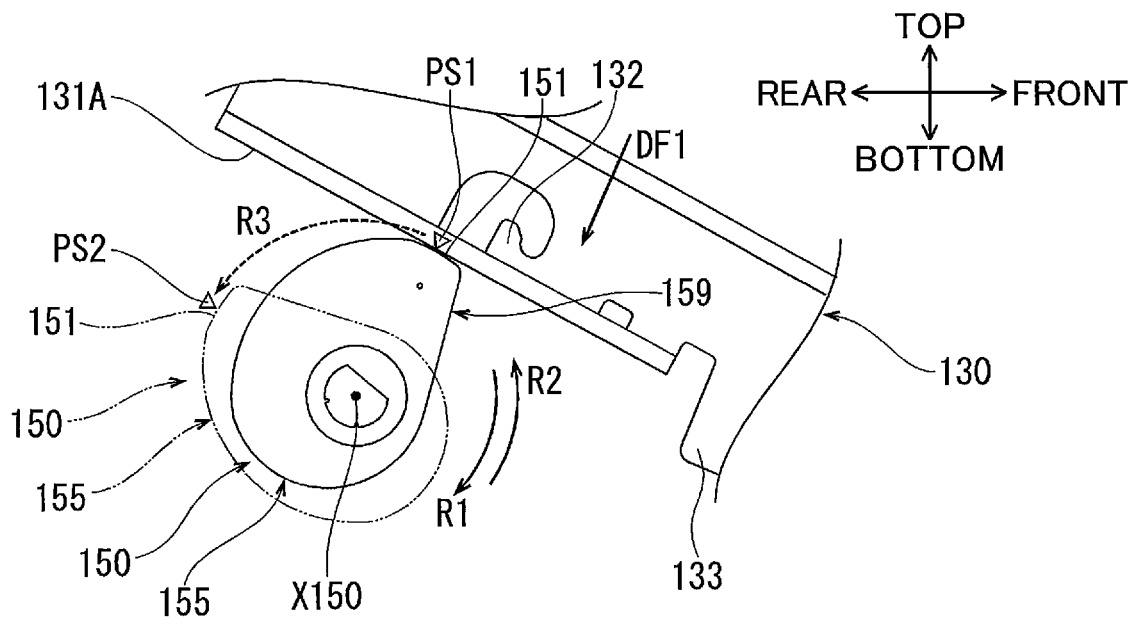
FIG. 18 is a partial side view for description of the first direction of the cam member according to the embodiment.

The postures of the cam member 150 and the holding member 130 denoted by solid lines in FIG. 18 are the same as those illustrated in FIG. 11 and correspond to a state where the heating belt unit 102 is displaced to the separation position of FIG. 4. The posture of the cam member 150 denoted by a dashed double-dotted line in FIG. 18 is the same as that illustrated in FIG. 17 and corresponds to a state where the heating belt unit 102 is displaced to the pressure contact position of FIG. 6.

As illustrated in FIG. 18, in a state where the heating belt unit 102 is displaced to the separation position of FIG. 4, the first part 151 of the cam member 150 is in contact with the contact surface 131A of the holding member 130 at a first position PS1. The first part 151 is an example of a part of the cam surface that is in contact with the holding member in a state where the second fixing member is displaced to the separation position.

Further, in a state where the heating belt unit 102 is displaced to the pressure contact position of FIG. 6, the first part 151 of the cam member 150 is positioned away from the contact surface 131A of the holding member 130 at a second position PS2.

Here, a direction R3 is defined as a direction in which the first part 151 rotates about the rotation axis X150 from the first position PS1 to the second position PS2 with the minimum distance. In other words, the direction R3 is a direction from the first position PS1 to the second position PS2 about the rotation axis X150 with the smaller central angle. The direction R3 is the same direction as the second direction R2. The first direction R1 is a direction opposite to the direction R3.

Setting the first direction R1 as the direction opposite to the direction R3 allows the cam members 150 to rotate with a comparatively long distance for displacement of the heating belt unit 102 between the pressure contact position of FIG. 6 and the separation position of FIG. 4. Hence, a range of displacement of the contacting position between the contact surface 131A of the holding member 130 and the cam surface 155 relative to the rotation axis X150 can be reduced.

As a result, the image forming apparatus 1 can obviate abrupt change in the direction in which the urging force of the tension coil springs 109 causes the cam members 150 to rotate about the rotation axis X150 from the first direction R1 to the second direction R2 or from the second direction R2 to the first direction R1 due to a change in the rotational posture of the cam members 150. Consequently, collision of components constituting the transmission section G1 can be restrained. Specifically, at the fitting portions between the shaft portions 191 of the transmission shaft 190 and the corresponding shaft holes 160 of the cam members 150 and at a fitting portion between the shaft portion 191 of the transmission shaft 190 and the transmission gear 199 (see FIGS. 2 and 8), the mutually-fitted components can be prevented from colliding with each other due to sudden elimination of a gap between the mutually-fitted components.

Figure 19:
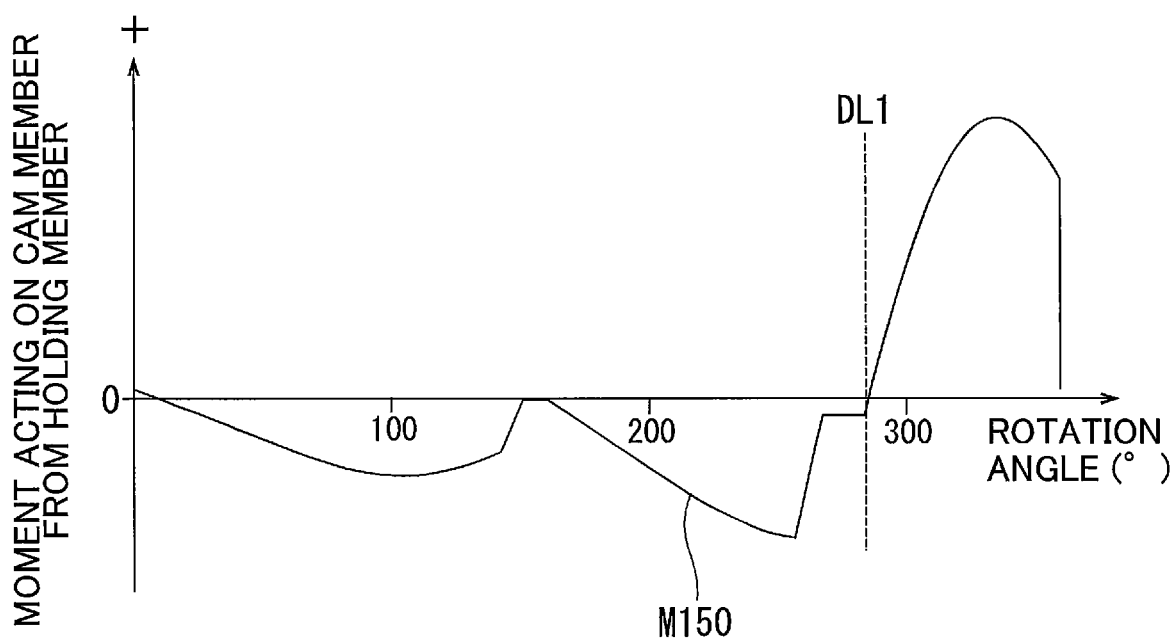
FIG. 19 is a graphical representation showing a relationship between a rotation angle of the cam member and a moment acting on the cam member from the holding member according to the embodiment.

In a graph illustrated in FIG. 19, a state where a rotation angle of the cam member 150 is at or near 0 degrees (origin) corresponds to a state where the heating belt unit 102 is displaced to the pressure contact position of FIG. 6, and a state where the rotation angle of the cam member 150 approaches an angle indicated by a dashed line DL1 corresponds to a state where the heating belt unit 102 is displaced to the separation position of FIG. 4. In this graph, a reaction force from the pressure roller 101 whose outer peripheral surface is partially pressed and deformed by the heating belt unit 102 is not taken into consideration.

When the cam member 150 rotates in the first direction R1, a reaction force acts on the cam surface 155 from the corresponding contact surface 131A of the holding member 130 urged by the tension coil spring 109, with the result that a rotational moment M150 about the rotation axis X150 acts on the cam member 150. When the rotation angle of the cam member 150 exceeds the angle indicated by the dashed line DL1, the direction of the rotational moment M150 is abruptly reversed. In the present embodiment, the cam member 150 rotates in the first direction R1 and the second direction R2 as long as the non-used surface 159 is out of contact with the corresponding contact surface 131A of the holding member 130. Thus, the rotation angle of the cam member 150 does not exceed the angle indicated by the dashed line DL1. That is, the controller C1 can suppress the cam member 150 rotating by the urging force of the tension coil spring 109 from abruptly changing its rotating direction from the first direction R1 to the second direction R2 or from the second direction R2 to the first direction R1 due to a change in the rotational posture of the cam member 150.

<Detailed Description of Control Program Starting from Turning On Image Forming Apparatus>

Figure 20:
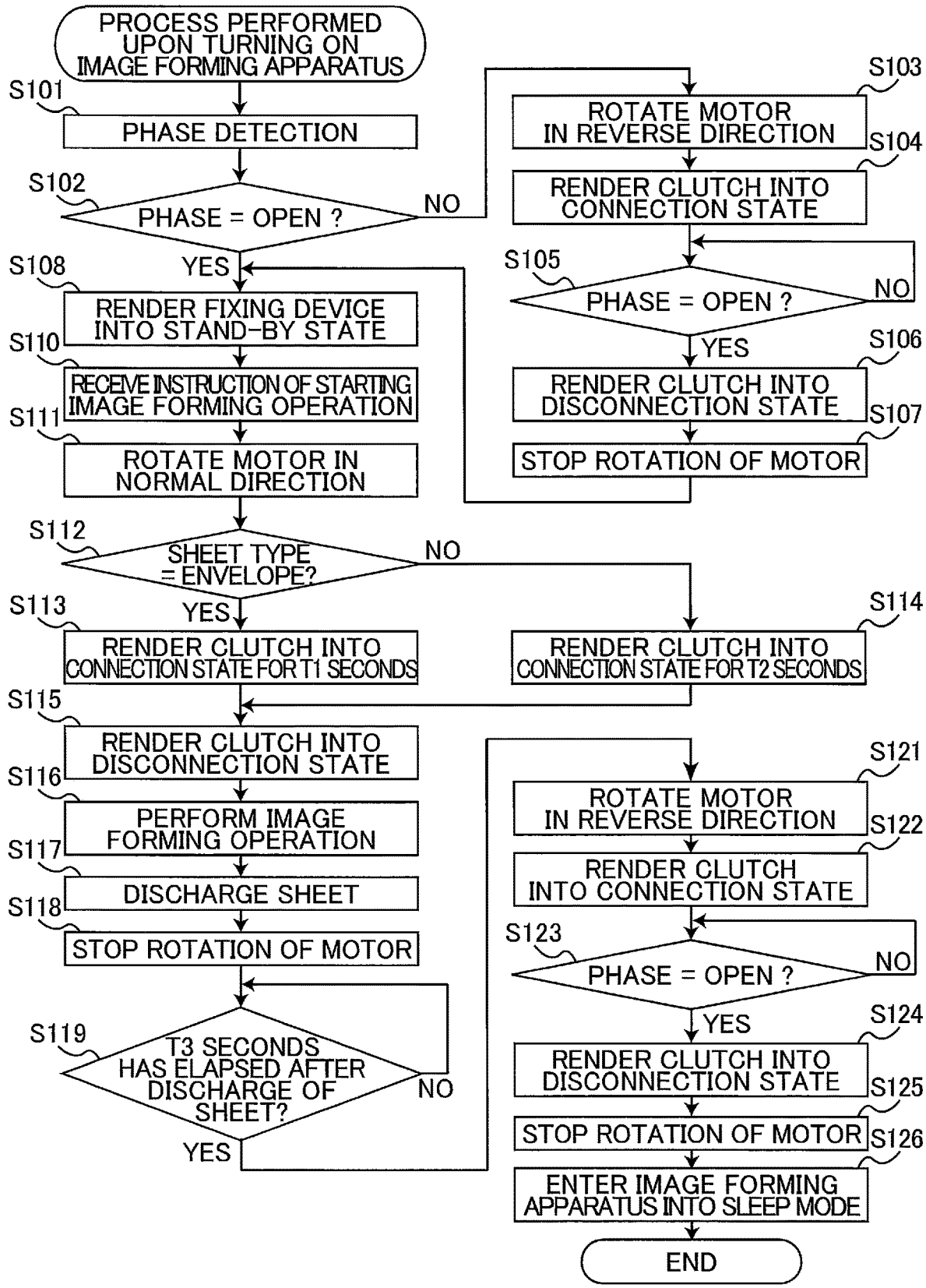
FIG. 20 is a flowchart illustrating steps in a control program starting from tuning on the image forming apparatus according to the embodiment.
Figure 21:
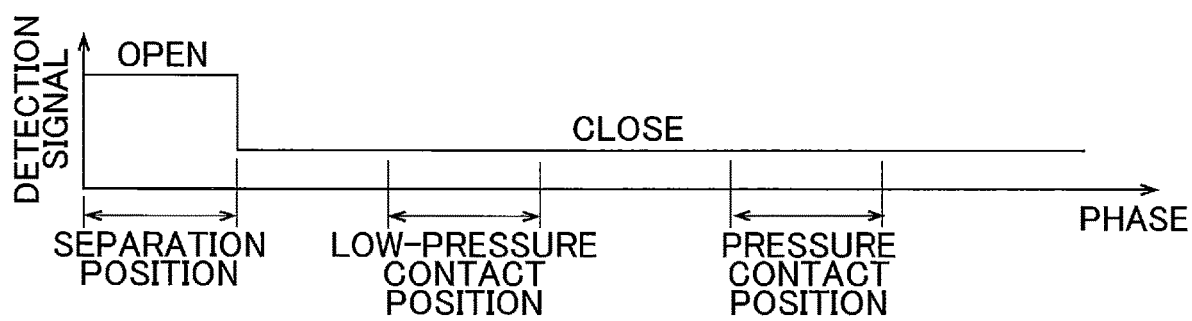
FIG. 21 is a graphical representation showing a relationship between the rotation angle of the cam member and the detection signal outputted from the sensor.

In the image forming apparatus 1 as described above, the controller C1 starts a control program illustrated in FIG. 20 upon turning on the image forming apparatus 1. In the control program, the controller C1 determines the rotational posture of the cam member 150 and the position of the heating belt unit 102 on a basis of a relationship illustrated in FIG. 21 between the rotation angle of the cam member 150 and the phase (OPEN signal or CLOSE signal) of the detection signal from the photointerrupter S1.

FIG. 20 is a flowchart illustrating an example of the identification process performed in the controller C1. In step S101, the controller C1 starts phase detection by the photointerrupter S1 upon turning on the image forming apparatus 1. The controller C1 permits the photointerrupter S1 to continuously perform the phase detection even after step S101 and until turning off the image forming apparatus 1.

Here, the expression "turning on the image forming apparatus 1" implies that, for example, a user presses a main power switch (not illustrated) of the image forming apparatus 1 to render the main power switch ON or a user plugs a power-supply cable (not illustrated) of the image forming apparatus into an electrical outlet (not illustrated) in a state where the main power switch is rendered on. Hence, when turning on the image forming apparatus 1, electric power is supplied to at least the controller C1. Further, the expression "tuning off the image forming apparatus 1" implies that, for example, a user presses the main power switch to suddenly render the main power switch OFF or a user suddenly unplugs the power-supply cable from the electrical outlet in a state where the main power-supply switch is rendered on. Hence, when turning off the image forming apparatus 1, electric power is not supplied to the controller C1.

Next, the controller C1 advances to step S102 to determine whether the phase of the detection signal from the photointerrupter S1 is an OPEN signal. In step S102, if the controller C1 determines that the phase of the detection signal from the photointerrupter S1 is an OPEN signal (S102: Yes), that is, if the photointerrupter S1 detects that the heating belt unit 102 is at the separation position of FIG. 4 upon turning on the image forming apparatus 1, the controller C1 controls the motor M1 not to rotate for prohibiting rotation of the cam member 150. Then, the controller C1 advances to step S108 to render the fixing device 100 into a stand-by state.

On the other hand, in step S102, if the controller C1 determines that the phase of the detection signal from the photointerrupter S1 is not an OPEN signal (S102: No), that is, if the photointerrupter S1 detects that the heating belt unit 102 is not at the separation position upon turning on the image forming apparatus 1, the controller C1 executes steps S103 through S107 to control the cam member 150 to rotate in the second direction R2 to displace the heating belt unit 102 to the separation position of FIG. 4. In this case, the controller C1 controls the cam member 150 to rotate in the second direction R2 regardless of whether the second part 152 contacts the contact surface 131A of the holding member 130.

Specifically, in step S103, the controller C1 controls the motor M1 to rotate in the reverse rotation direction.

Then, the controller C1 advances to step S104. In S104, electric power is supplied to the electromagnetic clutch GC1 to render the electromagnetic clutch GC1 into the connection state. Accordingly, the transmission section G1 transmits the driving force of the motor M1 to the cam member 150 to rotate the cam member 150 about the rotation axis X150 in the second direction R2.

Subsequently, the controller C1 advances to step S105 to determine whether the phase of the detection signal form the photointerrupter S1 is an OPEN signal. If the controller C1 determines that the phase of the detection signal from the photointerrupter S1 is not an OPEN signal (S105: NO), the controller C1 determines that the cam member 150 has not returned to the original position of FIG. 11. The controller C1 repeats the determination in step S105 until the controller C1 determines that the phase of the detection signal from the photointerrupter S1 is an OPEN signal.

On the other hand, if the controller C1 determines that the phase of the detection signal from the S1 is an OPEN signal (S105: YES), the controller C1 determines that the cam member 150 has returned to the original position of FIG. 11 and the heating belt unit 102 is displaced to the separation position of FIG. 4. Then, the controller C1 advances to step S106.

In step S106, electric power supply to the electromagnetic clutch GC1 is stopped and the electromagnetic clutch GC1 is rendered into the disconnection state. Thus, the transmission section G1 does not transmit the driving force of the motor M1 to the cam member 150, so that the cam member 150 is stopped at the original position of FIG. 11.

Next, the controller C1 advances to step S107 to control the motor M1 to stop its rotation, and then, advances to step S108 to render the fixing device 100 into the stand-by state.

Thereafter, when receiving an instruction of starting an image forming operation in step S110, the controller C1 advances to step S111 to control the motor M1 to rotate in the normal rotation direction.

Then, the controller C1 advances to step S112 to determine whether the type of the recording sheet SH on which an image is to be formed is an envelope. Incidentally, determination of the type of the recording sheets SH is made, for example, based on detection of thickness of the recording sheet SH by a sensor or based on input of the type of the recording sheet SH by a user. If the recording sheet SH is determined to be an envelope (S112: YES), the controller C1 executes steps S113 and S115 to displace the heating belt unit 102 to the low-pressure contact position of FIG. 5.

Specifically, in step S113, electric power is supplied to the electromagnetic clutch GC1 for T1 seconds to render the electromagnetic clutch GC1 into the connection state for T1 seconds. Accordingly, the transmission section G1 transmits the driving force of the motor M1 to the cam member 150 to rotate the cam member 150 about the rotation axis X150 in the first direction R1 for T1 seconds. Here, the T1 seconds is a time duration such that the cam member 150 rotates from the position illustrated in FIG. 11 to the position illustrated in FIG. 14.

Then, the controller C1 advances to step S115. In step S115, electric power supply to the electromagnetic clutch GC1 is stopped and the electromagnetic clutch GC1 is rendered into the disconnection state. Thereafter, the controller C1 advances to step S116. Hence, the cam member 150 is stopped at the position illustrated in FIG. 14. As a result, the heating belt unit 102 is displaced to the low-pressure contact position of FIG. 5.

On the other hand, if the controller C1 determines that the recording sheet SH is not an envelope (S112: NO), the controller C1 executes steps S114 and S115 to displace the heating belt unit 102 to the pressure contact position of FIG. 6.

Specifically, in step S114, electric power is supplied to the electromagnetic clutch GC1 for T2 seconds to render the electromagnetic clutch GC1 into connection state for T2 seconds. Accordingly, the transmission section G1 transmits the driving force of the motor M1 to the cam member 150 to rotate the cam member 150 about the rotation axis X150 in the first direction R1 for T2 seconds. Here, the T2 seconds is a time duration such that the cam member 150 rotates from the position illustrated in FIG. 11 to the position illustrated in FIG. 17. The T2 seconds are longer than the T1 seconds.

Then, the controller C1 advances to step S115. As described above, in step S115, electric power supply to the electromagnetic clutch GC1 is stopped and the electromagnetic clutch GC1 is rendered into the disconnection state. Thereafter, the controller C1 advances to step S116. Hence, the cam member 150 is stopped at the position illustrated in FIG. 17. As a result, the heating belt unit 102 is displaced to the pressure contact position of FIG. 6.

In step S116, the controller C1 controls the supply section 20, the process cartridge 7, the scanner section 8, and the fixing device 100 to perform the image forming operation. At this time, a fixing process is performed in the fixing device 100. Specifically, in the fixing process, the recording sheet SH is heated and pressed by the pressure roller 101 and the heating belt unit 102 positioned at the pressure contact position of FIG. 6 or the low-pressure contact position of FIG. 5 to thermally fix a developer image onto the recording sheet SH. Thus, a desirable fixing process in accordance with a thickness of the recording sheet SH can be performed by the fixing device 100.

Next, the controller C1 advances to step S117 to control the discharge section 29 to discharge, onto the discharge tray 2D, the recording sheet SH on which the developer image is thermally-fixed.

When all the recording sheets SH as printing targets have been discharged onto the discharge tray 2D, the controller advances to step S118 to control the motor M1 to stop its rotation.

Incidentally, a sensor (not illustrated) is disposed near a discharge port of the image forming apparatus 1 for detecting whether the recording sheet SH has been discharged onto the discharge tray 2D. Through the detection by this sensor, the controller C1 determines whether all the recording sheets SH have been discharged onto the discharge tray 2D. Here, the expression "all the recording sheets SH have been discharged" implies that the last one of the recording sheets SH has been discharged in a state where the controller C1 has not received a new print instruction and all the print jobs have been completed, for example.

Then, the controller C1 repeatedly executes step S119 until T3 seconds has elapsed after discharging of all the recording sheets SH in S117. Here, the T3 seconds is a waiting time period before the image forming apparatus 1 shifts to the sleep mode.

In S119, the controller C1 calculates a time from a moment all the recording sheets SH have been discharged and determines whether the T3 seconds has elapsed. If the controller C1 determines that the T3 seconds has elapsed (S119: YES), the controller C1 determines that the image forming apparatus 1 shifts into the sleep mode. If the controller C1 determines that the T3 seconds has not elapsed (S119: NO), the controller C1 controls the cam member 150 not to rotate for maintaining the position of the heating belt unit 102 at the pressure contact position of FIG. 6 or the low-pressure contact position of FIG. 5 until the controller C1 determines to enter the image forming apparatus 1 into the sleep mode based on the determination that the T3 seconds has elapsed.

Specifically, when the T3 seconds has elapsed (S119: YES), the controller C1 determines to enter the image forming apparatus 1 into the sleep mode. Immediately before the image forming apparatus 1 enters into the sleep mode (S126) after the controller C1 has determined to enter the image forming apparatus 1 into the sleep mode (S119), the controller C1 executes steps S121 through S125 to displace the heating belt unit 102 to the separation position of FIG. 4 from the pressure contact position of FIG. 6 or the low-pressure contact position of FIG. 5. The process executed in steps S121 through S125 is identical to the process executed in steps S103 through S107, respectively, and therefore, further description will be omitted.

After executing step S125, the controller C1 advances to step S126 to enter the image forming apparatus 1 into the sleep mode. In this way, the process performed upon turning on the image forming apparatus 1 is terminated. Incidentally, during the sleep mode, electric power is supplied to the controller C1, the photointerrupter S1, and the motor M1, but is not supplied to the transmission section G1, the supply section 20, the process cartridge 7, the scanner section 8, the fixing device 100, and the discharge section 29.

In accordance with the above-described control program performed by the controller C1, the heating belt unit 102 is displaced to the separation position of FIG. 4 in a case where the image forming apparatus 1 is transferred to the sleep mode, and, the heating belt unit 102 is displaced to the low-pressure contact position of FIG. 5 or the pressure contact position of FIG. 6 immediately before the start of the image forming operation. With this arrangement, a time period during which the pressure roller 101 is locally pressed and heated can be reduced, and consequently, quality in the fixing process can be maintained as well as improvement in durability of the fixing device 100 can be achieved.

<Detailed Description of Control Program According to Modification>

Figure 22:
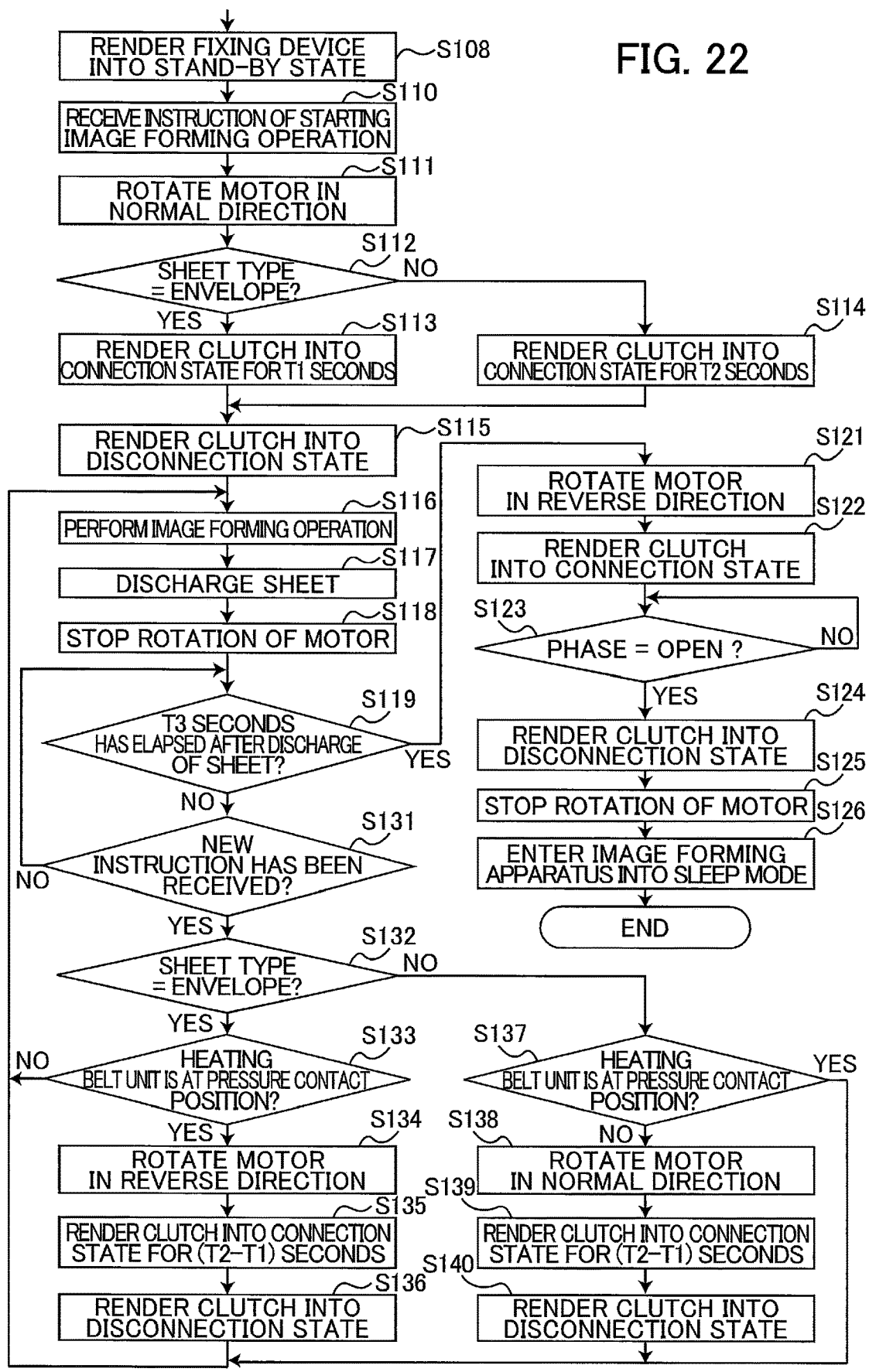
FIG. 22 is a flowchart illustrating steps in a control program according to a modification to the control program in FIG. 20.

A control program according to one modification will next be described with reference to a flowchart illustrated in FIG. 22. According to the modification, steps S131 through S140 are added between step S119 and step S121 of the above-described embodiment. The steps other than steps S131 through S140 in the modification is identical to the steps of the control program in the above-described embodiment. In the flowchart of FIG. 22, steps S101 through S107 are omitted since steps S101 through S107 in FIG. 22 is identical to steps S101 through S107 in FIG. 20.

In FIG. 22, when the controller C1 advances to step S119, the controller C1 determines whether the T3 seconds has elapsed after the recording sheet SH is discharged in S117. If the controller C1 determines that the T3 seconds has elapsed (S119: YES), the controller C1 advances to step S121 as described above. Description of steps S121 through S126 will be omitted since these steps have been described above in detail.

On the other hand, if the controller C1 determines that the T3 seconds has not yet elapsed (S119: NO), the controller C1 advances to step S131 to determine whether the controller C1 receives a new instruction of performing the image forming operation subsequent to the prior image forming operation. In step S131, if the controller C1 has not received the new instruction (S131: NO), the controller C1 returns to step S119, and steps S119 and S131 are repeatedly executed until elapse of the T3 seconds. While the controller C1 repeatedly executes steps S119 and S131, rotation of the cam member 150 is stopped so that the heating belt unit 102 is maintained at the position where the image forming operation has been performed in S116, that is, either the pressure contact position of FIG. 6 or the low-pressure contact position of FIG. 5, since the electromagnetic clutch GC1 has been rendered into the disconnection state in S115 and rotation of the motor M1 has been stopped in S118.

On the other hand, if the controller C1 has received the new instruction (S131: YES), the controller C1 advances to step S132 to determine whether the type of the recording sheet SH as printing target is an envelope. If the controller C1 determines that the recording sheet SH is an envelope (S132: YES), the controller C1 advances to step S133. On the other hand, if the controller C1 determines that the recording sheet SH is not an envelope (S132: NO), the controller C1 advances to step S137.

In step S133, the controller C1 determines whether the heating belt unit 102 is at the pressure contact position of FIG. 6. This determination is made in the controller C1 with reference to recorded past control data stored in ROM. For example, such past control data includes a point of time at which the original position of FIG. 11 of the cam member 150 is detected, history of normal rotation and reverse rotation of the motor M1 from the point of time, and history of electric power supply to the electromagnetic clutch GC1 from the point of time.

If the controller C1 determines that the heating belt unit 102 is at the low-pressure contact position of FIG. 5 (S133: NO), the controller C1 advances to step S116 to perform the image forming operation without displacing the heating belt unit 102, since the low-pressure contact position is a suitable position for fixing a developer image onto an envelope.

On the other hand, if the controller C1 determines that the heating belt unit 102 is at the pressure contact position (S133: YES), the controller C1 advances to step S134 to rotate the motor M1 in the reverse rotation direction, since the heating belt unit 102 must be displaced to the low-pressure contact position of FIG. 5.

Then, the controller C1 advances to step S135 to supply electric power to the electromagnetic clutch GC1 for (T2−T1) seconds to rotate the cam member 150 in the second direction R2 for (T2−T1) seconds. This (T2−T1) seconds corresponds to a time duration during which the cam member 150 rotates from the position illustrated in FIG. 17 to the position illustrated in FIG. 14 or from the position illustrated in FIG. 14 to the position illustrated in FIG. 17.

Then, the controller C1 advances to step S136. In step 136, electric power supply to the electromagnetic clutch GC1 is stopped and the electromagnetic clutch GC1 is rendered into the disconnection state. Hence, the cam member 150 stops at the position illustrated in FIG. 14 where the second part 152 of the cam surface 155 is in contact with the contact surface 131A of the holding member 130 to displace the heating belt unit 102 to the low-pressure contact position of FIG. 5. Thereafter, the controller C1 advances to step 116 to perform the image forming operation.

When the controller C1 advances to step S137 from step 132 (S132: NO), the controller C1 determines whether the heating belt unit 102 is at the pressure contact position of FIG. 6. This determination is made in the same way as step S133 as described above.

If the controller C1 determines that the heating belt unit 102 is at the pressure contact position (S137: YES), the controller C1 advances to step S116 to perform the image forming operation without displacing the heating belt unit 102.

If the controller C1 determines that the heating belt unit 102 is not at the pressure contact position (S137: NO), the controller C1 advances to step S138 to rotate the motor M1 in the normal rotation direction, since the heating belt unit 102 must be displaced to the pressure contact position of FIG. 6.

Then, the controller C1 advances to step S139 to supply electric power to the electromagnetic clutch GC1 for (T2−T1) seconds to rotate the cam member 150 in the first direction R1 for (T2−T1) seconds.

Then, the controller C1 advances to step S140. In step S140, electric power supply to the electromagnetic clutch GC1 is stopped and the electromagnetic clutch GC1 is rendered into the disconnection state. Hence, the cam member 150 is stopped at the position illustrated in FIG. 17 where the cam surface 155 is separated from the contact surface 131A of the holding member 130 to displace the heating belt unit 102 to the pressure contact position of FIG. 6. Thereafter, the controller C1 advances to step S116 to perform the image forming operation.

<Advantageous Effects>

In the image forming apparatus 1 according to the above-described embodiment, as is apparent from FIGS. 11 through 17, rotation of the cam members 150 in the first direction R1 and the second direction R2 by the motor M1 and the transmission section G1 illustrated in FIG. 2 automatically displaces the heating belt unit 102 between the pressure contact position illustrated in FIG. 6 and the separation position illustrated in FIG. 4. With this structure, a range of displacement of the contacting position between the contact surface 131A of the holding member 130 and the cam surface 155 relative to the rotation axis X150 can be reduced in comparison with a case where the cam member 150 is constantly rotated in a constant direction to displace the heating belt unit 102 between the pressure contact position illustrated in FIG. 6 and the separation position illustrated in FIG. 4 using not only the cam surface 155 but also the non-used surface 159.

Further, according to the image forming apparatus 1, as illustrated in FIG. 18, the first direction R1 is set to a direction opposite to the third direction R3 in which the cam member 150 is angularly rotated by an amount from the first position PS1 to the second position PS2 with a minimum distance about the rotation axis X150. According to the conventional image forming apparatus, the nip plate and the fusing belt are displaced between the pressure contact position and the separation position by the minimum rotational stroke of the cam.

However, according to the above-described image forming apparatus 1, the heating belt unit 102 can be displaced between the pressure contact position illustrated in FIG. 6 and the separation position illustrated in FIG. 6 by a relatively long rotational stroke of the cam member 150. With this structure, the range of displacement of the contacting position between the contacting surface 131A of the holding member 130 and the cam surface 155 with respect to the rotation axis X150 can further be reduced.

As a result, the image forming apparatus 1 can obviate abrupt change in the direction in which the urging force of the tension coil springs 109 causes the cam members 150 to rotate about the rotation axis 150X from the first direction R1 to the second direction R2 or from the second direction R2 to the first direction R1 due to a change in the rotational posture of the cam members 150. Consequently, collision of components constituting the transmission section G1 can be restrained. Specifically, at the fitting portions between the shaft portions 191 of the transmission shaft 190 and the corresponding shaft holes 160 of the cam members 150 and at a fitting portion between the shaft portion 191 of the transmission shaft 190 and the transmission gear 199 illustrated in FIG. 2, the mutually-fitted components can be prevented from colliding with each other due to sudden elimination of a gap between the mutually-fitted components.

Consequently, generation of abnormal noise can be suppressed with enhancing user's convenience in the image forming apparatus 1 according to the embodiment.

Further, according to the image forming apparatus 1, the cam surface 155 of the cam member 150 is separated from the contact surface 131A of the holding member 130 as illustrated in FIG. 17 in a state where the heating belt unit 102 is at the pressure contact position as illustrated in FIG. 6, and as a result, the non-used surface 159 opposes the contact surface 131A with a gap therebetween. In this state, a pressure contact force of the heating belt unit 102 against the pressure roller 101 is only attributed by the urging force of the tension coil springs 109. Consequently, a desired pressure contact force of the heating belt unit 102 can be easily set.

Further, in the image forming apparatus 1, as illustrated in FIG. 16, the heating belt unit 102 is brought into contact with the pressure roller 101 prior to the separation of the fourth part 154 of the cam surface 155 of the cam member 150 rotating in the first direction R1 from the contact surface 131A of the holding member 130. In other words, a timing at which the heating belt unit 102 contacts the pressure roller 101 is set earlier than a timing at which the cam surface 155 of the cam member 150 rotating in the first direction R1 separates from the holding member 130. With this structure, the cam surface 155 can restrict the displacement of the heating belt unit 102 at least until the heating belt unit 102 is brought into contact with the pressure roller 101 in a case where the heating belt unit 102 is displaced from the separation position illustrated in FIG. 4 to the pressure contact position illustrated in FIG. 6. Therefore, impacting collision of the heating belt unit 102 urged by the tension coil springs 109 against the pressure roller 101 can be restrained. Further, the urging force of the tension coil springs 109 and the reaction force applied to the heating belt unit 102 from the pressure roller 101 can be canceled from each other in a duration from contacting the heating belt unit 102 with the pressure roller 101 to separating the fourth part 154 of the cam surface 155 from the contact surface 131A of the holding member 130. Thus, abrupt rotation of the cam member 150 can be restrained, and as a result, generation of abnormal noise can further be suppressed.

Further, in the image forming apparatus 1, the first part 151 (FIG. 10) of the cam surface 155 is in contact with the holding member 130 in a state where the heating belt unit 102 is displaced to the separation position illustrated in FIG. 4. The first part 151 is an arcuate surface having the predetermined length L151 about the rotation axis X150, maintaining the first distance L1 between the first part 151 and the rotation axis X150. The reaction force from the holding member 130 may act to rotate the cam member 150 in such a case where the part of the cam surface 155 in contact with the contact surface 131A of the holding member 130 in a state where the heating belt unit 102 is displaced to the separation position of FIG. 4 is an apex of a sloped surface. In contrast, the first part 151 extending arcuately about the rotation axis X150 can stably receive the reaction force from the holding member 130 as illustrated in FIG. 11. Therefore, rotation of the cam member 150 due to the reaction force from the holding member 130 can be restrained.

Further, in the image forming apparatus 1, the heating belt unit 102 is displaced to the low-pressure contact position of FIG. 5 by the contact of the second part 152 of the cam surface 155 with the contact surface 131A of the holding member 130 as illustrated in FIG. 14. The second part 152 can easily set, between the pressure contact position of FIG. 6 and the separation position of FIG. 4, the low-pressure contact position (for example, an envelope mode) at which the pressure force against the heat roller 101 is lower than that at the pressure contact position.

Further, according to the image forming apparatus 1, when the heating belt unit 102 contacts the pressure roller 101, the third part 153 contacts the contact surface 131A of the holding member 130 before the second part 152 contacts the contact surface 131A of the holding member 130 as illustrated in FIG. 13. Assuming that the low-pressure contact position illustrated in FIG. 5 is a position at the exact moment for permitting the heating belt unit 102 to contact the pressure roller 101, the pressure force at the low-pressure contact position may be varied due to displacement of the low-pressure contact position as a result of minute rotation of the cam member 150, which may be caused by manufacturing error of the cam surface 155. In contrast, according to the above-described embodiment, since the third part 153 contacts the contact surface 131A of the holding member 130 prior to the contact of the second part 152 with the contact surface 131A when the heating belt unit 102 contacts the pressure roller 101, the low-pressure contact position may not be easily displaced in spite of minute rotation of the cam member 150, thereby restraining variation in pressure force at the low-pressure contact position.

Further, in the image forming apparatus 1, as illustrated in FIG. 10, the part of the cam surface 155 between the first part 151 and the second part 152 is in a form of a gently sloping curved surface, with the distance from the rotation axis X150 being gradually reduced in the second direction R2. With the gently curved part in the cam surface 155, the holding member 130 can be gradually displaced during the rotation of the cam member 150 between the separation position of FIG. 4 and the low-pressure contact position of FIG. 5, as illustrated in FIGS. 12 and 13. Consequently, generation of abnormal noise can further be suppressed.

Further, according to the image forming apparatus 1, as illustrated in FIG. 10, the part of the cam surface 155 between the fourth part 154 and the second part 152 is in a form of a gently sloping curved surface, with the distance from the rotation axis X150 being gradually reduced in the second direction R2. With the gently curved part in the cam surface 155, the holding member 130 can be gradually displaced during the rotation of the cam member 150 between the pressure contact position of FIG. 6 and the low-pressure contact position of FIG. 5. Consequently, generation of abnormal noise can further be suppressed.

Further, according to the image forming apparatus 1, as illustrated in FIG. 10, in the cam surface 155, the peripheral length LW1 between the first part 151 and the second part 152 is set greater than the peripheral length LW2 between the second part 152 and the fourth part 154. With the part of the cam surface 155 between the second part 152 and the fourth part 154, a large reaction force is acting on the cam surface 155 when the heating belt unit 102 pressingly contacts the pressure roller 101. Hence, action of the urging force of the tension coil springs 109 can be restrained. On the other hand, with the part of the cam surface 155 between the first part 151 and the second part 152, a reaction force acting on the cam surface 155 becomes small when the heating belt unit 102 pressingly contacts the pressure roller 101, and further, the heating belt unit 102 is moved away from the pressure roller 101 to eliminate the reaction force. Hence, the cam member 150 is easily influenced by the urging force of the tension coil springs 109. Accordingly, the above-described cam surface 155 can gradually displace the holding member 130 within a range of the cam surface 155 providing large influence on the tension coil springs 109.

Further, according to the image forming apparatus 1, as illustrated in FIGS. 2 and 3, the shaft hole 160 of the cam member 150 has a generally D-shaped cross-section, and the shaft portion 191 of the transmission shaft 190 has a generally D-shaped cross-section in conformance with the cross-section of the shaft hole 160. The second flat surface 192 of the shaft portion 191 is in abutment with first flat surface portion 161 of the shaft hole 160. As illustrated in FIG. 10, the first flat surface portion 161 is positioned such that the first flat surface portion 161 intersects the direction DD1 directing from the rotation axis X150 to the first part 151. In a state where the heating belt unit 102 is displaced to the separation position illustrated in FIG. 4, the reaction force from the holding member 130 is applied at the maximum level to the first part 151 in contact with the contact surface 131A of the holding member 130 as illustrated in FIG. 11. In this case, the reaction force is transmitted to the transmission shaft 190 through the first flat surface portion 161 of the shaft hole 160 and the second flat surface 192 of the shaft portion 191. Thus, the reaction force can be stably applied to the transmission shaft 190 having high mechanical strength.

Further, according to the image forming apparatus 1, as illustrated in FIGS. 9 and 10, the first and second protrusions 165, 166 protruding from the shaft hole 160 can stably permit the second flat surface 192 to abut against the first flat surface portion 161. Therefore, rattling which may occur between the shaft hole 160 and the shaft portion 191 can be reduced.

Further, according to the image forming apparatus 1, as illustrated in FIGS. 11 through 17, the contact surface 131A of the holding member 130 in contact with the cam surface 155 extends linearly as viewed along the rotation axis X150. Hence, the contacting position between the contact surface 131A and the cam surface 155 can be easily adjusted by designing the profile of the cam surface 155 in comparison with a case where the contact surface of the holding member 130 is curved shaped.

Further, in the image forming apparatus 1 according to the above-described embodiment, as illustrated in FIG. 20, in a case where the photointerrupter S1 detects that the heating belt unit 102 is at the separation position of FIG. 4 upon turning on the image forming apparatus 1, the determination in step S102 is rendered YES, and the fixing device 100 shifts to the stand-by state in step S108 where the motor M1 does not rotate the cam member 150.

On the other hand, in a case where the photointerrupter S1 detects that the heat belt 102 is not at the separation position of FIG. 4 upon turning on the image forming apparatus 1, the determination in step S102 is rendered NO, and steps S103 through S107 are executed. That is, the controller C1 permits the motor M1 to rotate the cam member 150 in the second direction R2 to displace the heating belt unit 102 to the separation position of FIG. 4. According to the above-described embodiment, the cam member 150 includes the cam surface 155 in which the distance from the rotation axis X150 is gradually reduced in the second direction R2. The cam member 150 further includes the non-used surface 159 extending between the one and the other ends of the cam surface 155.

Here, if the image forming apparatus 1 is suddenly turned off and then turned on, and if the cam member 150 which may assume to take various postures is rotated in the first direction R1, the contact surface 131A of the holding member 130 may be easily and vigorously abutted against the non-used surface 159 of the cam member 150. The above-described embodiment can restrain such disadvantageous abutment.

Further, in a case where the cam member 150 is rotated in the first direction R1 when the image forming apparatus 1 is suddenly turned off and then turned on, the contacting state may be changed from the state where the non-used surface 159 of the cam member 150 is in contact with the contact surface 131A of the holding member 130 to the state where the first part 151 of the cam member 150 is in contact with the contact surface 131A. In this case, the rotational moment M150 applied to the cam member 150 is abruptly reversed around the dashed line DL1, as illustrated in FIG. 19. However, according to the above-described embodiment, the cam member 150 is rotated in the second direction R2 upon turning on the image forming apparatus 1, such disadvantageous phenomenon can be obviated, so that collision between components constituting the transmission section G1, such as fitting portions between the shaft portions 191 of the transmission shaft 190 and the shaft holes 160 of the cam members 150 and between the shaft portion 191 of the transmission shaft 190 and the transmission gear 199 due to sudden elimination of the gap between the fitting portions can be restrained.

Accordingly, in the image forming apparatus 1 according to the above-described embodiment, generation of abnormal noise upon turning on the image forming apparatus 1 can be suppressed.

Further, in the image forming apparatus 1 according to the above-described embodiment, the single photointerrupter S1 is employed as illustrated in FIGS. 7 and 8 for detecting whether the heating belt unit 102 is at the separation position of FIG. 4. The controller C1 prohibits rotation of the cam member 150 by the motor M1 in a case where the photointerrupter S1 detects that the heating belt unit 102 is at the separation position of FIG. 4 when turning on the image forming apparatus 1. With this arrangement, the image forming apparatus 1 can suppress generation of abnormal noise while being manufactured at low cost because only the single photointerrupter S1 is employed in the image forming apparatus 1.

Further, in the image forming apparatus 1 according to the above-described embodiment, the single photointerrupter S1 as illustrated in FIGS. 7 and 8 detects whether the heating belt unit 102 is at the separation position of FIG. 4 on a basis of the rotational posture of the cam member 150. Specifically, the photointerrupter S1 detects the rib 199R and the cutout portion 199C to detect the rotational posture of the transmission gear 199 rotatable together with the cam member 150, to thus detect whether the cam member 150 is at the original position of FIG. 11, thereby detecting whether the heating belt unit 102 is at the separation position of FIG. 4. With this arrangement, simplified detection can be realized at low cost.

Further, in the image forming apparatus 1 according to the above-described embodiment, in step S102 in FIG. 20, the photointerrupter S1 only detects whether the first part 151 is in contact with the contact surface 131A of the holding member 130. The photointerrupter S1 does not detect whether the third part 153 is in contact with the contact surface 131A of the holding member 130. Therefore, in a state where the photointerrupter S1 detects that the heating belt unit 102 is not at the separation position of FIG. 4 upon turning on the image forming apparatus 1, stoppage of rotation of the cam member 150 with the third part 153 being in contact with the contact surface 131A of the holding member 130 can be restrained when the heating belt unit 102 is displaced to the separation position of FIG. 4. As a result, instability caused by urging the cam member 150 to rotate in the first direction R1 can be restrained.

Further, in the image forming apparatus 1 according to the above-described embodiment, in a state where the photointerrupter S1 detects that the heating belt unit 102 is not at the separation position of FIG. 4 upon turning on the image forming apparatus 1, the controller C1 controls the cam member 150 to rotate in the second direction R2 to displace the heating belt unit 102 to the separation position of FIG. 4 regardless of whether the second part 152 is in contact with the contact surface 131A of the holding member 130 as illustrated in steps S103 through S107 in FIG. 20. Therefore, the heating belt unit 102 can surely be displaced to the separation position of FIG. 4, avoiding stoppage at the low-pressure contact position of FIG. 5.

Further, in the image forming apparatus 1 according to the above-described embodiment, as in step S119 in FIGS. 20 and 22, the controller controls the cam member 150 not to rotate after the fixing process has completed and until the determination of entry of the image forming apparatus 1 into the sleep mode is made. Therefore, the heating belt unit 102 is maintained at the position where the fixing process is executed, for example, at one of the pressure contact position of FIG. 6 and the low-pressure contact position of FIG. 5 until immediately before the image forming apparatus 1 shifts to the sleep mode. Accordingly, an actuation process for the cam member 150 can be omitted or reduced in a case where the controller C1 receives a new instruction of performing the fixing process prior to entry of the image forming apparatus 1 into the sleep mode.

Further, in the image forming apparatus 1 according to the above-described modification, as in steps S131 through S140, the controller C1 controls the cam member 150 to rotate such that the cam surface 155 is moved away from the contact surface 131A of the holding member 130 or the second part 152 is brought into contact with the contact surface 131A in a case where the controller C1 receives a new instruction of the fixing process after completion of the prior fixing process and prior to determination of entry of the image forming apparatus 1 into the sleep mode. Accordingly, a process of temporarily returning the heating belt unit 102 to the separation position of FIG. 4 can be omitted in such a case where the heating belt unit 102 is displaced to the pressure contact position of FIG. 6 or the low-pressure contact position of FIG. 5 for performing the subsequent fixing process.

<Modifications>

While the description has been made in detail with reference to the embodiments thereof, it would be apparent to those skilled in the art that many modifications and variations may be made therein without departing from the scope of the disclosure.

The drive source and the transmission section are not limited to those of the above-described embodiment. For example, a motor for driving the cam member may be provided in addition to the motor for driving the pressure roller. Further, a drive source incapable of reverse rotation but capable of normal rotation or stopping the normal rotation may be used to rotate the cam members in the first direction and the second direction by changing over the rotational direction at the transmission section on the way to the cam members.

The first fixing member and the second fixing member are not limited to those of the above-described embodiment. For example, the first fixing member is a heat roller, and the second fixing member is a pressure roller that is movable toward and away from the heat roller.

The holding member may not be pivotally movably supported, but may be linearly movably supported. Further, the low-pressure contact position illustrated in FIG. 5 is not essential, but may be omitted.

The above-described configuration may also be available to other type of image forming apparatus, such as a multi-function peripheral and the like.

What is claimed is:

1. An image forming apparatus comprising:
a first fixing member;
a second fixing member configured to nip and heat a recording sheet in cooperation with the first fixing member to fix a developer image onto the recording sheet;
a holding member holding the second fixing member such that the second fixing member can be displaced between a pressure contact position and a separation position, the second fixing member in the pressure contact position being in pressure contact with the first fixing member, and the second fixing member in the separation position being positioned away from the first fixing member;
a cam member rotatable about a rotation axis in a first direction and a second direction opposite to the first direction, the cam member having a cam surface, a distance between the cam surface and the rotation axis being reduced in the second direction, a part of the cam surface being in contact with the holding member and the second fixing member being displaced to the separation position in a state where the cam member is at a first angular position, and the part of the cam surface being positioned away from the holding member and the second fixing member being displaced to the pressure contact position in a case where the cam member is at a second angular position, the first angular position and the second angular position of the cam member being defined such that a central angle, by which the cam member is required to rotate about the rotation axis in the first direction from the first angular position to the second angular position, being greater than a central angle, by which the cam member is required to rotate about the rotation axis in the second direction from the first angular position to the second angular position;
an urging member urging the second fixing member in an urging direction such that the second fixing member moves toward the first fixing member;
a drive source configured to generate a driving force for rotating the cam member in the first direction and in the second direction;
a transmission section configured to transmit the driving force to the cam member; and
a controller configured to control the drive source:
to provide rotation of the cam member about the rotation axis in the first direction from the first angular position to the second angular position, the rotation of the cam member in the first direction permitting the cam surface to be moved away from the holding member to displace the second fixing member urged by an urging force of the urging member to the pressure contact position; and
to provide rotation of the cam member about the rotation axis in the second direction from the second angular position to the first angular position, the rotation of the cam member in the second direction permitting the cam surface to be brought into contact with the holding member to displace the second fixing member to the separation position against the urging force of the urging member.

2. The image forming apparatus according to claim 1, wherein a timing at which the second fixing member contacts the first fixing member is set earlier than a timing at which the cam surface of the cam member rotating in the first direction separates from the holding member.

3. The image forming apparatus according to claim 2, wherein the part of the cam surface is a first part of the cam surface providing a first distance from the rotation axis, the first distance being a largest distance between the rotation axis and the cam surface, the first part extending by a first predetermined length about the rotation axis while maintaining the first distance.

4. The image forming apparatus according to claim 3, wherein the cam surface further includes a second part away from the first part about the rotation axis by a predetermined distance in the second direction, the second part providing a second distance from the rotation axis, the second distance being smaller than the first distance and extending by a second predetermined length about the rotation axis while maintaining the second distance.

5. The image forming apparatus according to claim 4, wherein the cam surface further includes a third part contacting the holding member when the second fixing member contacts the first fixing member, the third part being positioned away from the second part about the rotation axis in the first direction, the third part providing a third distance from the rotation axis, the third distance being larger than the second distance.

6. The image forming apparatus according to claim 4, wherein the cam surface further includes a first intervening part between the first part and the second part, the first intervening part being gently curved such that a distance between the first intervening part and the rotation axis is gradually reduced in the second direction.

7. The image forming apparatus according to claim 6, wherein the cam surface further includes a fourth part separating from the holding member on a way to the pressure contact position of the second fixing member after the second fixing member contacts the first fixing member, the fourth part being positioned away from the second part about the rotation axis in the second direction, the fourth part providing a fourth distance from the rotation axis, the fourth distance being smaller than the second distance, and
wherein the cam surface further includes a second intervening part between the second part and the fourth part, the second intervening part being gently curved such that a distance between the second intervening part and the rotation axis is gradually reduced in the second direction.

8. The image forming apparatus according to claim 7, wherein the first intervening part has a peripheral length greater than a peripheral length of the second intervening part.

9. The image forming apparatus according to claim 3, wherein the cam member has a shaft hole coaxial with the rotation axis, the shaft hole having an arcuate surface portion and a first flat surface portion cutting away a cylindrical surface to provide a D-shape in cross-section, the first flat surface portion being positioned so as to cross a direction from the rotation axis to the first part, and
wherein the transmission section includes a transmission shaft having a shaft portion fitted with the shaft hole, the shaft portion having a D-shape in cross-section in conformance with the D-shape of the shaft hole, the D-shape of the shaft portion including a second flat surface in abutment with the first flat surface portion.

10. The image forming apparatus according to claim 9, wherein the arcuate surface portion of the shaft hole has a pair of protrusions positioned opposite to each other with respect to a line, the line being perpendicular to the first flat surface portion and passing the rotation axis, the pair of protrusions protruding toward the first flat surface portion.

11. The image forming apparatus according to claim 1, wherein the holding portion has a contact surface configured to contact the cam surface, the contact surface extending linearly as viewed in a direction of the rotation axis.

12. The image forming apparatus according to claim 1, further comprising: a sensor configured to detect whether or not the second fixing member is in the separation position,
wherein the controller is configured to prohibit the rotation of the cam member in the first direction and the rotation of the cam member in the second direction in a case where the sensor detects that the second fixing member is in the separation position upon turning on the image forming apparatus, and
wherein the controller is configured to permit the rotation of the cam member in the second direction to displace the second fixing member to the separation position in a case where the sensor detects that the second fixing member is not in the separation position upon turning on the image forming apparatus.

13. The image forming apparatus according to claim 12, wherein the cam surface includes a first part providing a first distance from the rotation axis, the first distance being a largest distance between the rotation axis and the cam surface,
wherein the rotation of the cam member in the second direction permits the first part to contact the holding member to displace the second fixing member to the separation position, and
wherein the sensor is configured to detect whether or not the second fixing member is in the separation position based on detection of a rotational posture of the cam member.

14. The image forming apparatus according to claim 13, wherein the cam surface further includes a prescribed part contacting the holding member when the second fixing member contacts the first fixing member,
wherein the cam surface further includes an intervening part between the first part and the prescribed part, the intervening part being gently curved such that a distance between the intervening part and the rotation axis is gradually reduced in the second direction, and
wherein the sensor is configured to only detect whether or not the first part is in contact with the holding member.

15. The image forming apparatus according to claim 14, wherein the cam surface further includes a second part away from the first part about the rotation axis by a predetermined distance in the second direction, the second part providing a second distance from the rotation axis, the second distance being smaller than the first distance, and
wherein the controller is configured to permit the rotation of the cam member in the second direction to displace the second fixing member to the separation position regardless of whether the second part is in contact with the holding member in a case where the sensor detects that the second fixing member is not in the separation position upon turning on the image forming apparatus.

16. The image forming apparatus according to claim 15, wherein the controller is configured to prohibit the rotation of the cam member in the first direction and the rotation of the cam member in the second direction after a fixing process for thermally fixing the developer image onto the recording sheet is completed and until shift of the image forming apparatus to a sleep mode is determined.

17. The image forming apparatus according to claim 15, wherein the controller is configured to permit one of the rotation of the cam member in the first direction and the rotation of the cam member in the second direction to bring the cam surface into one of a position where the cam surface is separated from the holding member and a position where the second part is in contact with the holding member in a case where the controller receives a new instruction of performing a fixing process for thermally fixing the developer image onto the recording sheet after the previous fixing process is completed and before shift of the image forming apparatus to a sleep mode is determined.

18. An image forming apparatus comprising:
   a first fixing member;
   a second fixing member configured to nip a recording sheet in cooperation with the first fixing member to fix a developer image onto the recording sheet;
   a side wall configured to support the first fixing member;
   a holding member holding the second fixing member, the holding member including
      a front end portion pivotably supported by the side wall,
      a rear end portion, and
      an engagement portion positioned between the front end portion and the rear end portion and being engagement with the second fixing member;
   an urging member configured to urge the second fixing member toward the first fixing member, the urging member connecting the side wall and the rear end portion of the holding member; and
   a cam member rotatable relative to the side wall about a rotational axis and including a peripheral surface,
   wherein the peripheral surface of the cam member includes
      a cam surface that is contactable the holding member and is configured to change a pressure force between the first fixing member and the second fixing member, and
      a non-used surface that is out of contact with the holding member,
   wherein the cam surface includes one end part and another end part spaced apart from each other in a peripheral direction about the rotational axis, the one end part including a first edge with respect to the non-used surface in the peripheral direction, the another end part including a second edge with respect to the non-used surface in the peripheral direction, the first edge and the second edge defining a pair of borders of the cam surface with respect to the non-used surface in the peripheral direction,
   wherein a radius of the cam member is defined as a distance between the peripheral surface of the cam member and the rotational axis, the radius of the cam member at the first edge being greater than the radius of the cam member at the second edge,
   wherein a pair of radial lines are defined such that one of the pair of radial lines extends from the rotational axis to the first edge, and another one of the pair of radial lines extends from the rotational axis to the second edge,
   wherein the first sector portion is defined as being surrounded by the pair of radial lines and the cam surface,
   wherein the second sector portion is defined as being surrounded by the pair of radial lines and the non-used surface,
   wherein a central angle of the first sector portion is greater than a central angle of the second sector portion, and
   wherein the radius of the cam member within the cam surface has a maximum value at the first edge and a minimum value at the second edge.

19. The image forming apparatus according to claim 18, wherein the radius of the cam member within the cam surface monotonically decreases from the first edge to the second edge in the peripheral direction,
   wherein the one end part includes a pair of opposite edges that are spaced apart from each other in the peripheral direction, one of the pair of opposite edges being the first edge, a peripheral length of the one end part being defined between the opposite edges of the one end part in the peripheral direction,
   wherein the radius of the cam member within the cam surface is uniform over an entire peripheral length of the one end part including the first edge,
   wherein the cam surface further includes a middle part between the one end part and the another end part in the peripheral direction,
   wherein the middle part includes a pair of opposite edges that are spaced apart from each other in the peripheral direction, a peripheral length of the middle part being defined between the opposite edges of the middle part in the peripheral direction,
   wherein the radius of the cam member within the middle part is smaller than the radius of the cam member at the first edge, and is greater than the radius of the cam member at the second edge,
   wherein the radius of the cam member within the cam surface and is uniform over an entire peripheral length of the middle part,
   wherein the cam surface further includes
      a first intervening part positioned between the one end part and the middle part in the peripheral direction, wherein the radius of the cam member within the first intervening part is gradually reduced in a direction from the one end part to the middle part in the peripheral direction, and
      a second intervening part positioned between the middle part and the another end part in the peripheral direction, wherein the radius of the cam member within the second intervening part is gradually reduced in a direction from the middle part to the another end part in the peripheral direction,
   wherein the first intervening part and the second intervening part each include a pair of opposite edges that are spaced apart from each other in the peripheral direction, a peripheral length of the first intervening part being defined between the opposite edges of the first intervening part in the peripheral direction, and a peripheral length of the second intervening part being defined between the opposite edges of the second intervening part in the peripheral direction, and
   wherein the peripheral length of the first intervening part being is greater than the peripheral length of the second intervening part.

20. The image forming apparatus according to claim 19, wherein the peripheral length of the one end part of the cam surface is greater than the peripheral length of the middle part of the cam surface.

21. The image forming apparatus according to claim 18, wherein a protrusion protrudes from the cam member in a direction toward the side wall along the rotational axis, a shaft hole coaxial with the rotational axis penetrating the cam member and the protrusion, wherein a shaft is inserted in the shaft hole, and wherein the cam member and the shaft are supported by the side wall via the protrusion.

22. The image forming apparatus according to claim 18, wherein the urging member includes a tension coil spring having one end connected to the side wall and another end connected to the rear end portion of the holding member, and wherein the rotational axis of the cam is positioned between the one end and the another end of the tension coil spring in a direction in which the tension coil spring extends between the one end and the another end of the coil spring.

23. The image forming apparatus according to claim 19, wherein the second fixing member is out of contact with the first fixing member while the cam surface is in contact with the holding member at a position between the first edge and a predetermined point in the peripheral direction, the predetermined point being within the first intervening part, and wherein the second fixing member is in contact with the first fixing member while the cam surface is in contact with the holding member at a position between the predetermined point and the second edge in the peripheral direction.

24. The image forming apparatus according to claim 19, wherein when a predetermined point of the first intervening part passes through a contact position between the holding member and the cam surface, a state of the second fixing member with respect to the first fixing member changes between a contact state, where the second fixing member is in contact with the first fixing member, and a separation state, where the second fixing member is out of contact with the first fixing member.

* * * * *

UNITED STATES PATENT AND TRADEMARK OFFICE
CERTIFICATE OF CORRECTION

PATENT NO. : 10,838,333 B2
APPLICATION NO. : 16/025146
DATED : November 17, 2020
INVENTOR(S) : Shota Shinoya and Yasuhiro Suzuki Page 1 of 1

It is certified that error appears in the above-identified patent and that said Letters Patent is hereby corrected as shown below:

In the Claims

Claim 19, Column 32, Line 35:
Please change: "surface and is uniform over an entire peripheral length" to -- surface is uniform over an entire peripheral length --

Claim 19, Column 32, Line 61:
Please change: "part being is greater than the peripheral length of the" to -- part is greater than the peripheral length of the --

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*